US011934795B2

United States Patent
Nizar et al.

(10) Patent No.: US 11,934,795 B2
(45) Date of Patent: Mar. 19, 2024

(54) AUGMENTED TRAINING SET OR TEST SET FOR IMPROVED CLASSIFICATION MODEL ROBUSTNESS

(71) Applicant: Oracle International Corporation, Redwood Shores, CA (US)

(72) Inventors: Naveen Jafer Nizar, Chennai (IN); Ariel Gedaliah Kobren, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 17/392,562

(22) Filed: Aug. 3, 2021

(65) Prior Publication Data

US 2022/0245362 A1  Aug. 4, 2022

(30) Foreign Application Priority Data

Jan. 29, 2021 (IN) .............................. 202141004034
Jan. 30, 2021 (IN) .............................. 202141004131

(51) Int. Cl.
*G06F 40/45* (2020.01)
*G06F 40/47* (2020.01)

(52) U.S. Cl.
CPC .............. *G06F 40/45* (2020.01); *G06F 40/47* (2020.01)

(58) Field of Classification Search
CPC ........ G06F 40/45; G06F 40/47; G06F 40/157; G06F 40/194; G06F 40/284; G06F 40/30; G06F 40/216; G06F 16/35; G06F 40/56; G06N 20/00
See application file for complete search history.

(56) References Cited

U.S. PATENT DOCUMENTS

| 11,669,687 | B1 * | 6/2023 | Joshi | ....................... G06F 40/30 704/9 |
| 2020/0226212 | A1 * | 7/2020 | Tan | ........................ G06F 18/214 |
| 2020/0241917 | A1 * | 7/2020 | Chen | .................... G06F 18/2113 |
| 2020/0302273 | A1 * | 9/2020 | Chung | ................. G06V 10/454 |

(Continued)

OTHER PUBLICATIONS

Garg, S., & Ramakrishnan, G. (2020). Bae: Bert-based adversarial examples for text classification. arXiv preprint arXiv:2004.01970. (Year: 2020).*

(Continued)

*Primary Examiner* — Bhavesh M Mehta
*Assistant Examiner* — Philip H Lam
(74) *Attorney, Agent, or Firm* — Invoke

(57) ABSTRACT

A target set of texts, for training and/or evaluating a text classification model, is augmented using insertions into a base text within the original target set. In an embodiment, an expanded text, including the base text and an insertion word, must satisfy one or more inclusion criteria in order to be added to the target set. The inclusion criteria may require that the expanded text constitutes a successful attack on the classification model, the expanded text has a satisfactory perplexity score, and/or the expanded text is verified as being valid. In an embodiment, if a number of expanded texts added into the target set is below a threshold number, insertions are made into an expanded text (which was generated based on the base text). Inclusion criteria are evaluated against the doubly-expanded text to determine whether to add the doubly-expanded text to the target set.

19 Claims, 11 Drawing Sheets

(56) References Cited

U.S. PATENT DOCUMENTS

| | | | |
|---|---|---|---|
| 2021/0012156 A1* | 1/2021 | Vijaykeerthy | G06N 3/084 |
| 2021/0173872 A1* | 6/2021 | Tan | G06F 40/211 |
| 2021/0224486 A1* | 7/2021 | Stabler | G06F 18/2148 |
| 2021/0326751 A1* | 10/2021 | Liu | G06N 3/084 |
| 2021/0334459 A1* | 10/2021 | Dvijotham | G06F 40/247 |
| 2021/0342552 A1 | 11/2021 | Mishra et al. | |
| 2023/0025317 A1* | 1/2023 | Miao | G06F 16/35 |

OTHER PUBLICATIONS

Palomino, D., & Luna, J. O. (2020). Palomino-Ochoa at TASS 2020: Transformer-based Data Augmentation for Overcoming Few-Shot Learning. In IberLEF@ SEPLN (pp. 171-178). (Year: 2020).*

Kumar, V., Choudhary, A., & Cho, E. (2020). Data augmentation using pre-trained transformer models. arXiv preprint arXiv: 2003.02245. (Year: 2020).*

Liu, P., Wang, X., Xiang, C., & Meng, W. (Aug. 2020). A survey of text data augmentation. In 2020 International Conference on Computer Communication and Network Security (CCNS) (pp. 191-195). IEEE. (Year: 2020).*

Wu, X., Lv, S., Zang, L., Han, J., & Hu, S. (2019). Conditional bert contextual augmentation. In Computational Science—ICCS 2019: 19th International Conference, Faro, Portugal, Jun. 12-14, 2019, Proceedings, Part IV 19 (pp. 84-95). (Year: 2019).*

Sellam, T., Das, D., & Parikh, A. P. (2020). BLEURT: Learning robust metrics for text generation. arXiv preprint arXiv:2004.04696. (Year: 2020).*

Nie, W., Narodytska, N., & Patel, A. (Sep. 2018). Relgan: Relational generative adversarial networks for text generation. In International conference on learning representations. (Year: 2018).*

Zhang, T., Kishore, V., Wu, F., Weinberger, K. Q., & Artzi, Y. (2019). Bertscore: Evaluating text generation with bert. arXiv preprint arXiv: 1904.09675. (Year: 2019).*

Zhou, W., Ge, T., Xu, C., Xu, K., & Wei, F. (2021). Improving sequence-to-sequence pre-training via sequence span rewriting. arXiv preprint arXiv:2101.00416. (Year: 2021).*

Xu, J., Ren, X., Lin, J., & Sun, X. (2018). Diversity-promoting GAN: A cross-entropy based generative adversarial network for diversified text generation. In Proceedings of the 2018 conference on empirical methods in natural language processing (pp. 3940-3949). (Year: 2018).*

Li, D., Zhang, Y., Peng, H., Chen, L., Brockett, C., Sun, M. T., & Dolan, B. (2020). Contextualized perturbation for textual adversarial attack. arXiv preprint arXiv:2009.07502. (Year: 2020).*

Gu, J., et al., "Search engine guided neural machine translation," In Thirty-Second AAAI Conference on Artificial Intelligence, Apr. 27, 2018, pp. 5133-5140.

Jia, R., et al., "Adversarial Examples for Evaluating Reading Comprehension Systems," Proceedings of the 2017 Conference on Empirical Methods in Natural Language Processing, Sep. 2017, pp. 2021-2031.

Koh, P.W et al., "Understanding black-box predictions via influence functions," In Proceedings of the 34th International Conference on Machine Learning, vol. 70, Mar. 14, 2017. pp. 1885-1894.

Alishahi, A., et al., "Analyzing and Interpreting Neural Networks for NLP: A Report on the First BlackboxNLP Workshop," Natural Language Engineering, vol. 25, Issue 4, Jul. 2019, pp. 19.

Alzantot, M., et al., "Generating Natural Language Adversarial Examples," Proceedings of the 2018 Conference on Empirical Methods in Natural Language Processing, Oct.-Nov. 2018, pp. 9.

Casanueva, I., et al., "Efficient Intent Detection with Dual Sentence Encoders," Proceedings of the 2nd Workshop on Natural Language Processing for Conversational AI, Jul. 9, 2020, pp. 38-45.

Coucke, A., et al., "Snips Voice Platform: an embedded Spoken Language Understanding system for private-by-design voice interfaces," May 2018, pp. 29.

Devlin et al., "BERT: Pre-training of deep bidirectional transformers for language understanding," In Proceedings of the 2019 Conference of the North American Chapter of the Association for Computational Linguistics, 2019, pp. 4171-4186.

Gardner, M., et al., "Evaluating Models' Local Decision Boundaries via Contrast Sets," Findings of the Association for Computational Linguistics: EMNLP 2020, Jan. 2020, pp. 17.

Han, X., et al., "Explaining black box predictions and unveiling data artifacts through influence functions," Proceedings of the 58th Annual Meeting of the Association for Computational Linguistics, Jul. 5-10, 2020, pp. 5553-5563.

Kaushik, D., et al., "Learning the difference that makes a difference with counterfactually-augmented data," In International Conference on Learning Representations, 2020, pp. 17.

Khandelwal, U., et al., "Generalization through memorization: Nearest neighbor language models," ICLR, 2020, pp. 13.

Kobayashi, S., et al., "Contextual Augmentation: Data Augmentation byWords with Paradigmatic Relations," Proceedings of NAACL-HLT, Jun. 1-6, 2018, pp. 452-457.

Larson, S., et al., "An evaluation dataset for intent classification and out-of-scope prediction," In Proceedings of the 2019 Conference on Empirical Methods in Natural Language Processing and the 9th International Joint Conference on Natural Language Processing (EMNLP-IJCNLP), Nov. 3-7, 2019, pp. 1311-1316.

Li, C., et al., "Linguistically-Informed Transformations (LIT ): A Method for Automatically Generating Contrast Sets," Proceedings of the Third BlackboxNLP Workshop on Analyzing and Interpreting Neural Networks for NLP, Nov. 20, 2020, pp. 126-135.

McCoy, R.T., et al., "Right for the wrong reasons: Diagnosing syntactic heuristics in natural language inference," Proceedings of the 57th Annual Meeting of the Association for Computational Linguistics, Jul. 28-Aug. 2, 2019, pp. 3428-3448.

Min, J., et al., "Syntactic Data Augmentation Increases Robustness to Inference Heuristics," Proceedings of the 58th Annual Meeting of the Association for Computational Linguistics, Jul. 5-10, 2020, pp. 2339-2352.

Rajani, N, F., et al., "Explaining and Improving Model Behavior with k Nearest Neighbor Representations," Oct. 2020, pp. 9.

Ribeiro et al., "Semantically Equivalent Adversarial Rules for Debugging NLP Models", In Proceedings of the 56th Annual Meeting of the Association for Computational Linguistics (vol. 1: Long Papers), 2018, pp. 856-865.

Ribeiro, M., et al., "Beyond Accuracy: Behavioral Testing of NLP Models with CheckList," Proceedings of the 58th Annual Meeting of the Association for Computational Linguistics, Jul. 5-10, 2020, pp. 4902-4912.

Weston, J., et al., "Retrieve and refine: Improved sequence generation models for dialogue," Proceedings of the 2018 EMNLP Workshop SCAI: The 2nd Int'l Workshop on Search-Oriented Conversational AI, Oct. 31, 2018, pp. 87-92.

Wiseman, S., "Label-Agnostic Sequence Labeling by Copying Nearest Neighbors," Proceedings of the 57th Annual Meeting of the Association for Computational Linguistics, Jul. 28-Aug. 2, 2019, pp. 5363-5369.

Wolf, T., et al., "Huggingface's transformers: State-of-the-art natural language processing," Proceedings of the 2020 EMNLP, Nov. 16-20, 2020, pp. 38-45.

Zhang, J., et al., "Guiding Neural Machine Translation with Retrieved Translation Pieces," NAACL, 2018, pp. 11.

"Diverse Data Augmentation via Unscrambling Text with Missing Words," Anonymous EMNLP submission, pp. 1-11.

Lee, K., et al., "Neural Data Augmentation via Example Extrapolation," Cornell University. Feb. 2, 2021, pp. 14.

Guu K. et al., "Generating Sentences by Editing Prototypes", Transactions of the Association for Computational Linguistics, 2018, pp. 14.

Lai Ivan, "Conditional Text Generation by Fine Tuning GPT-2", Retrieved from https://towardsdatascience.com/conditional-text-generation-by-fine-tuning-gpt-2-11c1a9fc639d, Jan. 27, pp. 1-9.

Uchimoto K. et al., "Text generation from keywords", Proceedings of the 19th international conference on Computational linguistics, 2002, vol. 1, pp. 7.

* cited by examiner

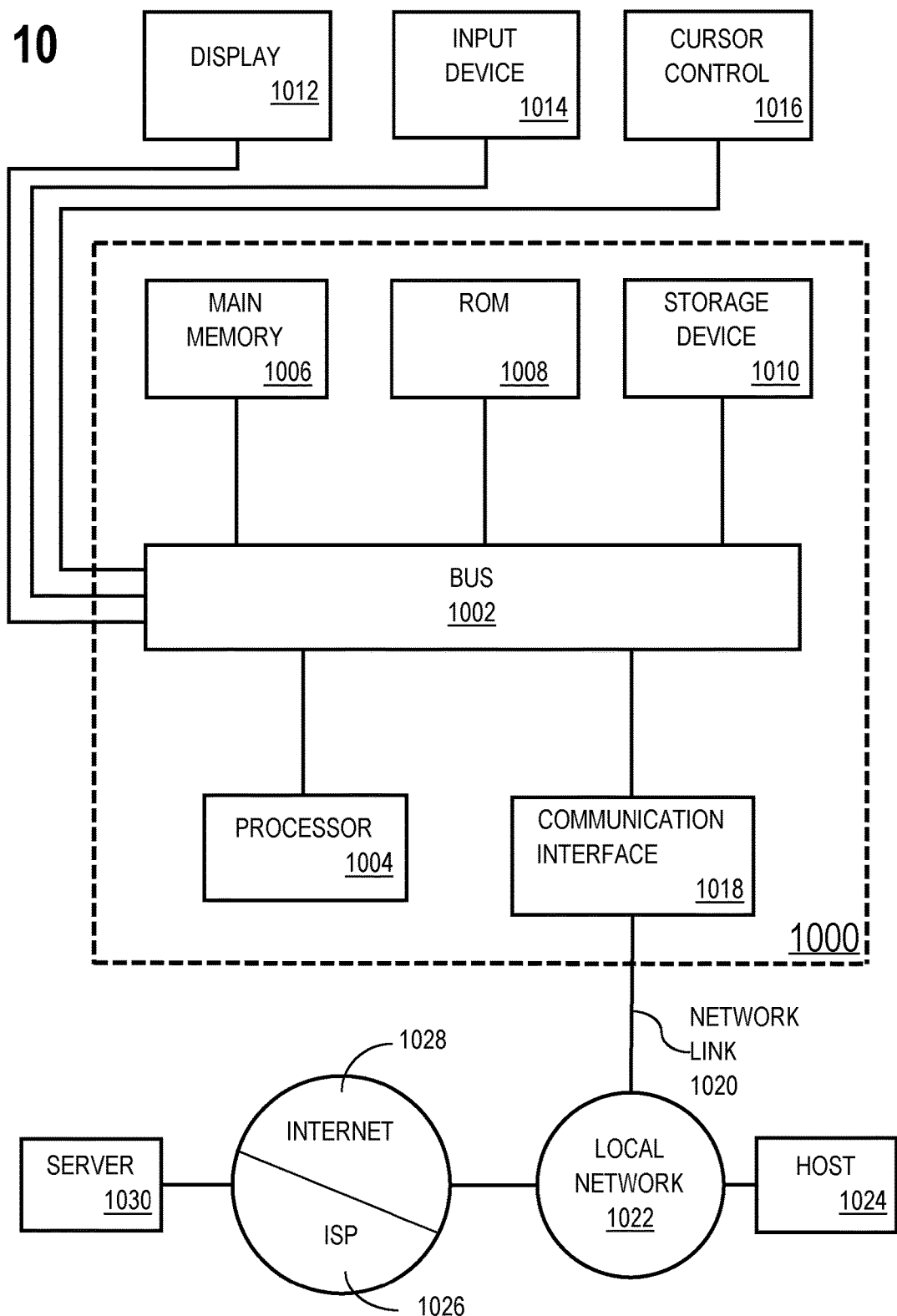

AUGMENTED TRAINING SET OR TEST SET FOR IMPROVED CLASSIFICATION MODEL ROBUSTNESS

RELATED APPLICATIONS; INCORPORATION BY REFERENCE

This application claims the benefit of Indian Provisional application No. 202141004034, filed Jan. 29, 2021 and Indian Provisional application No. 202141004131, filed Jan. 30, 2021; each of which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to natural language processing classification models. In particular, the present disclosure relates to augmenting a training set or test set for improved classification model robustness.

BACKGROUND

Natural language processing (NLP) relates to how computers process and analyze natural language data. An important step in NLP is text classification. Text classification is the process of assigning tags or categories to text according to its content. Example applications of text classification include intent detection, sentiment analysis, content labeling, and spam detection. Text classification systems may be rule-based, machine-learned, and/or a hybrid of both. Rule-based systems classify text into organized groups by using a set of handcrafted linguistic rules. Machine-learned systems are trained to make classifications based on a training set of data. The training set of data includes artificial texts and/or real-world texts that are associated with classifications verified by a user and/or other means. A classification for a text that is verified by a user and/or other means is referred to as a "true classification," or a "ground truth label." The quality of the training set affects the quality of a machine-learned text classification system.

Text classification systems are typically evaluated based on a test set of data. A text classification system outputs a classification for each text in a test set. A classification for a text that is output from a text classification system is referred to as a "predicted classification," or a "predicted label." The predicted classification and true classification for each text in a test set are compared to determine an accuracy, precision, and/or recall of the text classification system. Accuracy refers to the percentage of texts that were categorized with the correct tag. Precision refers to the percentage of texts the classifier got right out of the total number of texts that the classifier predicted for a given tag. Recall refers to the percentage of texts the classifier predicted for a given tag out of the total number of texts that the classifier should have predicted for that given tag. The quality of the test set affects the quality of an evaluation of a text classification system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1A:
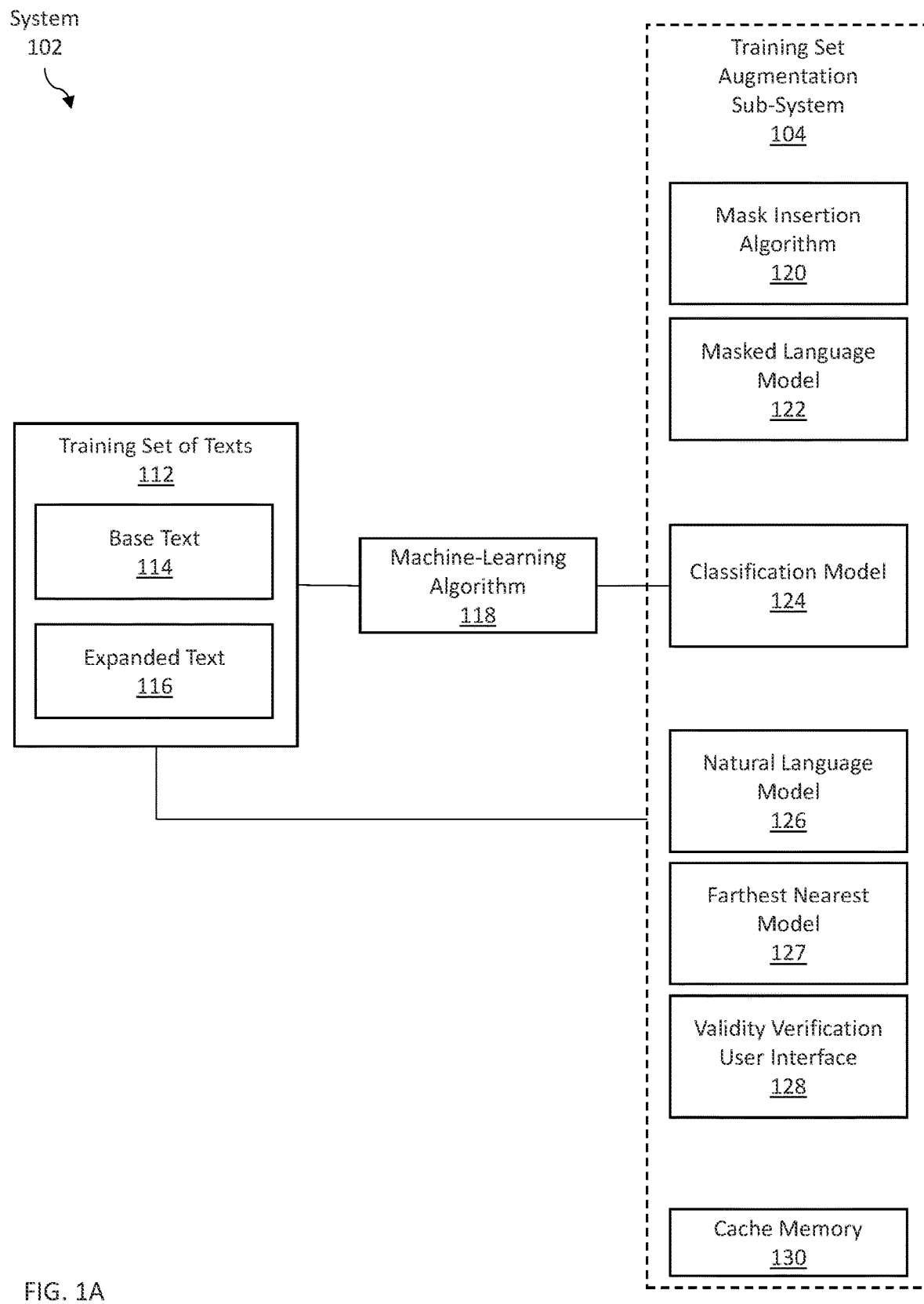
FIG. 1A illustrates a classification model machine learning system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include augmenting a target set of text for training or testing a text classification model. A base text, within the target set of text, is selected. Masked texts are generated from the base text, each masked text including a mask at a different position within the base text. Expanded texts are generated from the masked texts, each expanded text including a predicted word in place of the mask. A machine-learned natural language model may be used to determine the predicted words. At least a subset of the expanded texts are added to the target set of texts. The augmented target set of texts improves the quality of the machine training for the text classification model. Additionally or alternatively, the augmented target set of texts improves the quality of the evaluation for the text classification model.

One or more embodiments include conditioning inclusion of an expanded text into a target set upon the expanded text's success in attacking the text classification model. An "attack" on a text classification model refers to inputting a piece of text to the text classification model with an aim of obtaining an incorrect predicted classification from the text classification model. A "successful" attack refers to a scenario where the piece of text is actually incorrectly classified by the text classification model. An expanded text is expected to have a same classification as a base text from which the expanded text is generated. Hence, an expanded text is included into the target set if the predicted classification (output from the text classification model) for the expanded text is different from the true classification for the base text; an expanded text is excluded from the target set if the predicted classification for the expanded text is same as the true classification for the base text.

One or more embodiments include conditioning inclusion of an expanded text into a target set upon the expanded text's perplexity score satisfying a threshold ranking and/or threshold score. A perplexity score of a text reflects a probability of encountering the text in real-world data (lower perplexity score reflects higher probability). A natural language model is applied to each expanded text generated from a base text, to determine a respective perplexity score. The perplexity scores are ranked (lower perplexity scores being ranked first). Hence, an expanded text is included into the target set if the expanded text is associated with a perplexity ranking within a threshold ranking; an expanded text is excluded from the target set if the expanded text is associated with a perplexity ranking that is not within a threshold ranking. Additionally or alternatively, an expanded text is included into the target set if the expanded text is associated with a perplexity score below a threshold score; an expanded text is excluded from the target set if the expanded text is associated with a perplexity score that is not below a threshold score.

One or more embodiments include conditioning inclusion of an expanded text into a target set upon the expanded text having a farthest nearest distance from the existing texts currently in the target set. Each text in the target set is mapped onto a latent space. Each expanded text is also mapped onto the latent space. First, a respective "nearest distance" is determined for each expanded text. Out of the distances between a particular expanded text and each existing text, the minimum distance is the "nearest distance" associated with the particular expanded text. Second, a "farthest nearest distance" is determined over the expanded texts. Out of the nearest distances associated with the expanded texts, the maximum distance is the "farthest nearest distance." One or more expanded texts are included into the target set if the expanded texts are associated with one of the farthest nearest distances from the existing texts; one or more expanded texts are excluded from the target set if the expanded texts are not associated with one of the farthest nearest distances from the existing texts.

One or more embodiments include conditioning inclusion of an expanded text into a target set upon the expanded text's validity as verified by a user and/or other means. A text is "valid" if the text can appear in real-world data—for example, the text is grammatically correct, and the text makes logical sense. A user interface presents expanded texts to a user, and receives user input indicating which expanded texts are valid. An expanded text is included into the target set if the expanded text is valid; an expanded text is excluded from the target set if the expanded text is invalid.

In one or more embodiments, expanded texts that satisfy one or more of the above conditions are more likely (than expanded texts that do not satisfy the condition(s)) to improve the quality of a training set, which thereby improves the machine learning process for re-training the text classification model. Additionally or alternatively, expanded texts that satisfy one or more of the above conditions are more likely (than expanded texts that do not satisfy the condition(s)) to improve the quality of a test set, which thereby improves the evaluation process for evaluating the text classification model.

One or more embodiments described in this Specification and/or recited in the claims may not be included in this General Overview section.

2. System Architecture

FIG. 1A illustrates a classification model machine learning system in accordance with one or more embodiments. As illustrated in FIG. 1A, a system 102 includes a training set of texts 112, a machine-learning algorithm 118, and a training set augmentation sub-system 104. In one or more embodiments, the system 102 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, a training set 112 of texts refers to a set of texts that are input into a machine-learning algorithm 118 in order to train and/or update a classification model 124. The training set may include artificial texts, such as texts that are created for the purposes of training the classification model 124. Additionally or alternatively, the training set may include real-world texts, such as texts previously input to the classification model 124. The texts may be complete sentences, partial sentences, documents, short messages, emails, books, websites, and/or portions thereof.

Each text within the training set 112 is associated with a classification (also referred to as a "label") that is verified by a user and/or other means. The verified classification may be an expected output from the classification model 124. A classification that is verified is referred to as a "true classification." As an example, a classification model may be configured to perform intent detection. Candidate classifications may include various intents, such as "Time Inquiry," "Weather Inquiry," and "Location Inquiry." Hence, each text within a training set would be associated with a label (or other information) indicating an intent of the text, which would be one of "Time Inquiry," "Weather Inquiry," and "Location Inquiry."

In an embodiment, a training set 112 includes a base text 114 and/or an expanded text 116. A base text 114 is a piece of text within the training set 112 prior to application of a training set augmentation sub-system 104. An expanded text 116 is a piece of text generated based on a base text 114 by a training set augmentation sub-system 104. An expanded text 116 may be added to a training set 112 if the expanded text 116 satisfies one or more inclusion criteria.

In one or more embodiments, a training set of texts 112 is stored in a data repository (not illustrated). A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a machine-learning algorithm 118, classification model 124, and/or other illustrated components. Alternatively or additionally, a data repository may be implemented or executed on a computing system separate from a machine-learning algorithm 118, classification model 124, and/or other illustrated components. The data repository may be communicatively coupled to the machine-learning algorithm 118, classification model 124, and/or other illustrated components via a direct connection or via a network.

In one or more embodiments, a machine-learning algorithm 118 is an algorithm that can be iterated to learn a target model f using a training set 112 of texts. A training set 112 includes texts (such as base text 114 and/or expanded text 116) and corresponding true classifications. A machine-learning algorithm 118 attempts to output a target model f that best maps the texts of the training set 112 to the corresponding true classifications of the training set 112. The training set 112 may be updated based on, for example, verification of the accuracy of the current target model f. Updated training data is fed back into the machine learning algorithm 118, which in turn updates the target model f, thereby further training the target model f.

A machine learning algorithm 118 generates a target model f such that the target model f best fits the texts of a training set 112 to the true classifications of the training set 112. Additionally or alternatively, a machine learning algorithm 118 generates a target model f such that when the target model f is applied to the texts of the training set 112, a maximum number of predicted classifications determined by the target model f matches the true classifications of the training set 112. In particular, a machine-learning algorithm 118 generates a text classification model 124. Different classification models 124 may be generated based on different machine learning algorithms 118 and/or different training sets 112.

A machine learning algorithm 118 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a training set augmentation sub-system 104 refers to hardware and/or software configured to perform operations described herein for augmenting a training set 112 of texts for training a classification model 124. Examples of operations for augmenting a training set 112 of texts are described below with reference to FIG. 2. A training set augmentation sub-system 104 includes a mask insertion algorithm 120, a masked language model 122, a classification model 124, a natural language model 126, a farthest nearest model 127, a validity verification user interface 128, and/or a cache memory 130.

In an embodiment, a mask insertion algorithm 120 refers to hardware and/or software configured to perform operations described herein for inserting a mask into a base text 114 to generate one or more masked texts. Examples of operations for generating masked texts from a base text are described below with reference to FIG. 3.

In an embodiment, a masked language model 122 refers to hardware and/or software configured to perform operations described herein for inserting an insertion word in place of a mask within a masked text to generate an expanded text 116. The masked language model 122 may determine multiple insertion words suitable for insertion, each insertion word being used to generate a different expanded text 116. Examples of operations for generating expanded texts from a base text are described below with reference to FIG. 4. Examples of masked language models include Bidirectional Encoder Representations from Transformers (BERT), developed by Google LLC, and/or variants thereof.

In an embodiment, a classification model 124 (also referred to as a "text classification model") refers to hardware and/or software configured to perform operations described herein for outputting a predicted classification for an input text. A classification model 124 may be used outside of a training set augmentation sub-system 104 to determine a predicted classification of any text. A classification model 124 may be used inside a training set augmentation sub-system 104 to determine a predicted classification of an expanded text 116. The predicted classification for the expanded text 116 is used to determine a successfulness of the expanded text 116 in attacking the classification model 124. Examples of operations for conditioning inclusion of an expanded text into a target set upon the expanded text's success in attacking the text classification model are described below with reference to FIG. 5.

In an embodiment, a natural language model 126 refers to hardware and/or software configured to perform operations described herein for determining a perplexity score for an input text, such as a base text 114 and/or expanded text 116. Examples of operations for conditioning inclusion of an expanded text into a target set upon the expanded text's perplexity score satisfying a threshold ranking and/or threshold score are described below with reference to FIG. 6. Examples of natural language models include Generative Pre-trained Transformer 2 (GPT-2), and/or Generative Pre-trained Transformer (GPT).

In an embodiment, a farthest nearest model 127 refers to hardware and/or software configured to perform operations described herein for selecting a subset of input texts, from a pool of input texts, that are associated with a farthest nearest distance with respect to a training set 112. The input texts includes expanded texts output from a masked language model 122. Distances are determined based on vector space representations of the input texts and existing texts of a training set 112 in latent space. A latent space is a representation of compressed data in which similar data points are closer together in space. The vector space representations may be any number of dimensions, such as 512 dimensions. Examples of operations for conditioning inclusion of an expanded text into a target set upon the expanded text having a farthest nearest distance from the existing texts currently in the target set in accordance with one or more embodiments are described below with reference to FIG. 7.

In an embodiment, a validity verification user interface 128 refers to hardware and/or software configured to perform operations described herein for verifying a validity of an input text, such as a base text 114 and/or expanded text 116. Examples of operations for conditioning inclusion of an expanded text into a target set upon the expanded text's validity as verified by a user and/or other means are described below with reference to FIG. 8. A validity verification user interface 128 may be the same user interface configured to receive specification of one or more base texts 114 in the training set 112. Alternatively a validity verification user interface 128 may be a component of a stand-alone text verification sub-system, and hence is different from a user interface configured to receive specification of one or more base texts 114 in the training set 112.

A validity verification user interface 128 is configured to facilitate communications between a user and a training set augmentation sub-system 104. A validity verification user interface 128 renders user interface elements for presenting information to a user and/or receiving information (that is, user input) from a user. Examples of user interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

Components of a user interface may be specified in various languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Additionally or alternatively, a user interface, or any component thereof, is specified in one or more other languages, such as Java, C, or C++.

In an embodiment, a cache memory 130 refers to hardware and/or software configured to temporarily store results from any of a mask insertion algorithm 120, a masked language model 122, a classification model 124, a natural language model 126, and/or a validity verification user interface 128. A cache memory 130 may be implemented on a data repository.

In one or more embodiments, a training set augmentation sub-system 104 (and/or any components thereof) is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

Figure 1B:
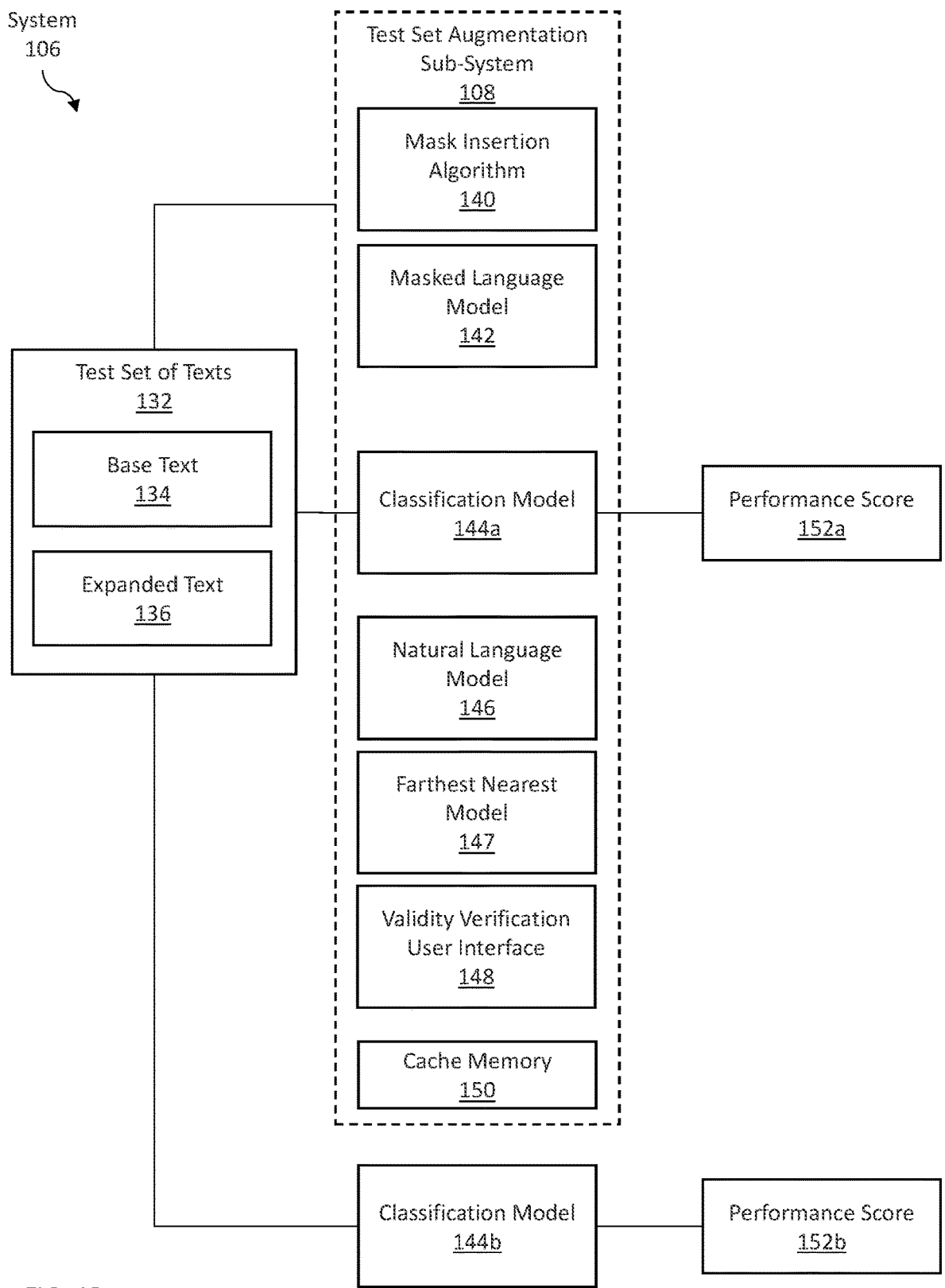
FIG. 1B illustrates a classification model evaluation system in accordance with one or more embodiments.

FIG. 1B illustrates a classification model evaluation system in accordance with one or more embodiments. As illustrated in FIG. 1, a system 106 includes a test set 132 of texts, a test set augmentation sub-system 108, one or more classification models 144a-b, and one or more performance scores 152a-b. In one or more embodiments, the system 106 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

In one or more embodiments, a test set 132 of texts refers to a set of texts that are input into one or more classification models 144a-b to evaluate the classification models 144a-b. Otherwise, a test set 132 is similar to a training set 112 of texts of FIG. 1A. A test set 132 may include artificial texts and/or real-word texts.

A test set 132 may include a base text 134, which is similar to a base text 114 of FIG. 1A. A test set 132 may include an expanded text 136, which is similar to an expanded text 116 of FIG. 1A.

A test set 132 is stored in a data repository (not illustrated).

In one or more embodiments, a test set augmentation sub-system 108 refers to hardware and/or software configured to perform operations described herein for augmenting a test set 132 of texts for testing one or more classification models 144a-b. Examples of operations for augmenting a test set 132 of texts are described below with reference to FIG. 2.

In an embodiment, a mask insertion algorithm 140 is similar to a mask insertion algorithm 120 of FIG. 1A. A masked language model 142 is similar to a masked language model 122 of FIG. 1A. A natural language model 146 is similar to a natural language model 126 of FIG. 1A. A farthest nearest model 147 is similar to a farthest nearest model 127 of FIG. 1A. A validity verification user interface 148 is similar to a validity verification user interface 128 of FIG. 1A. A cache memory 150 is similar to a cache memory 130 of FIG. 1A.

In an embodiment, a classification model 144a-b is similar to a classification model 124 of FIG. 1A. However, classification models 144a-b may be different from each other in terms of modeling function, weights used in the modeling functions, connections between different layers in a deep learning model, and/or any other attributes related to classification models. The differences may be due to differences in machine learning algorithms, training data, and/or any other factors contributing to generation of the classification models 144-ab. A particular classification model 144a may both (a) be used for selecting expanded texts for inclusion into an augmented test set 132 and (b) be evaluated based on the same augmented test set 132. Another classification model 144b may be evaluated based on an augmented test set 132 without any contribution to determining the augmented test set 132.

Figure 2:
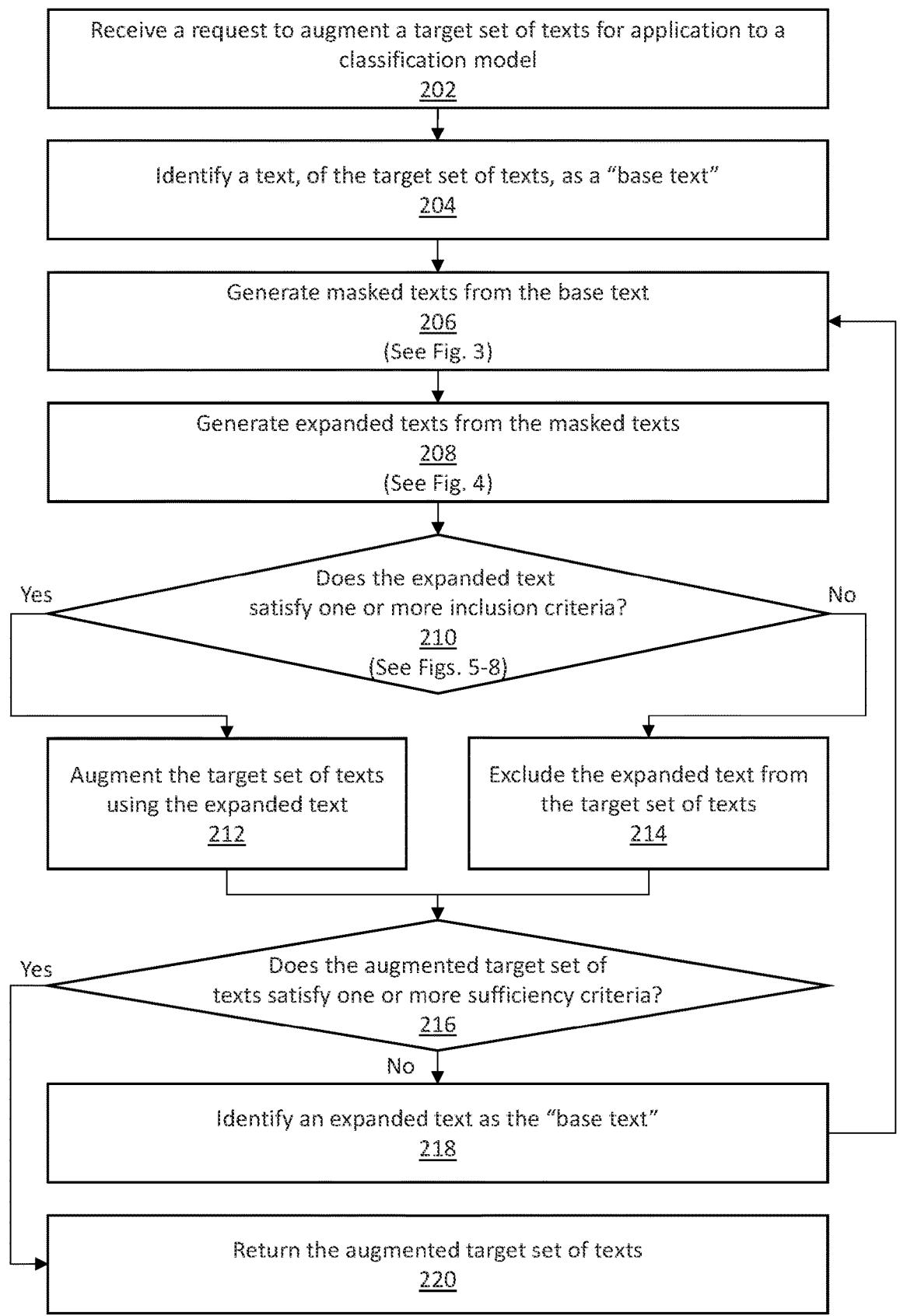
FIG. 2 illustrates an example set of operations for augmenting a target set of texts in accordance with one or more embodiments.

3. Augmenting a Target Set of Texts for Training and/or Testing a Text Classification Model FIG. 2 illustrates an example set of operations for augmenting a target set of texts in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include receiving a request to augment a target set of texts for application to a classification model (Operation 202). A target set augmentation system receives a request to augment a target set of texts for application to a classification model. The target set of texts may be a training set of texts and/or a test set of texts. A training set of texts would be used for training the classification model using a machine learning algorithm. Additionally or alternatively, a test set of texts would be used for evaluating one or more classification models.

One or more embodiments include identifying a text, of the target set of texts, as a "base text" (Operation 204).

One or more embodiments include generating masked texts from the base text (Operation 206). Examples of operations for generating masked texts from a base text are described below with reference to FIG. 3.

One or more embodiments include generating expanded texts from the masked texts (Operation 208). Examples of operations for generating expanded texts from masked texts, which are generated from a base text are described below with reference to FIG. 4. The expanded texts may be referred to as being "indirectly" generated from the base text.

One or more embodiments include determining whether the expanded text satisfies one or more inclusion criteria (Operation 210). Examples of operations for determining whether the expanded text satisfies one or more inclusion criteria are described below with reference to FIGS. 5-8. The inclusion criteria include: (a) the expanded text is a successful attack on the classification model, (b) the expanded text has a perplexity ranking and/or perplexity score that satisfies a threshold ranking and/or threshold score, (c) the expanded text is associated with a farthest nearest distance with respect to the base text(s), and/or (d) the expanded text has been verified as being valid.

If inclusion criteria are satisfied, one or more embodiments include augmenting the target set of texts using the expanded text (Operation 212). The target set augmentation system adds the expanded text into the target set of texts. Additionally the target set augmentation system associates the expanded text with the true classification of the base text. Hence, the true classification of the expanded text added to the target set is the same as the true classification of the base text.

If inclusion criteria are not satisfied, one or more embodiments include excluding the expanded text from the target set of texts (Operation 214).

In an embodiment, prior to proceeding with Operation 216, the target set augmentation system may select another text of the target set of texts as the "base text." The target set augmentation system may iterate Operations 206-214 with respect to the newly-selected base text.

One or more embodiments include determining whether the augmented target set of texts satisfies one or more sufficiency criteria (Operation 216). The target set augmentation system identifies one or more sufficiency criteria. One sufficiency criterion may require that the number of expanded texts being added to the target set be above a threshold number and/or threshold percentage increase. Another sufficiency criterion may require that the types of expanded texts being added to the target set be associated with a certain level of diversity. As an example, a sufficiency criterion may require that the added expanded texts have insertion words at different positions within the base text.

The target set augmentation system determines an attribute associated with the augmented target set of texts, such as a number of added expanded texts in the augmented target set, and/or a diversity attribute associated with the added expanded texts in the augmented target set. The target set augmentation system compares the attribute with the sufficiency criteria to determine whether the sufficiency criteria are satisfied.

One or more embodiments include identifying an expanded text as the "base text" (Operation 218). The target set augmentation system proceeds to generate additional expanded text based on existing expanded text. Hence, the target set augmentation system identifies the set of expanded text that was just included into the target set during iterations of Operation 212. The target set augmentation system selects a text, from the set of previously-generated expanded texts, as the "base text." The target set augmentation system may iterate Operations 206-214 with respect to the newly-selected base text.

If the sufficiency criteria are satisfied, one or more embodiments include returning the augmented target set of texts (Operation 220). The target set augmentation system returns the augmented target set of texts. The augmented target set of texts may be used for training and/or testing a classification model.

Figure 3:
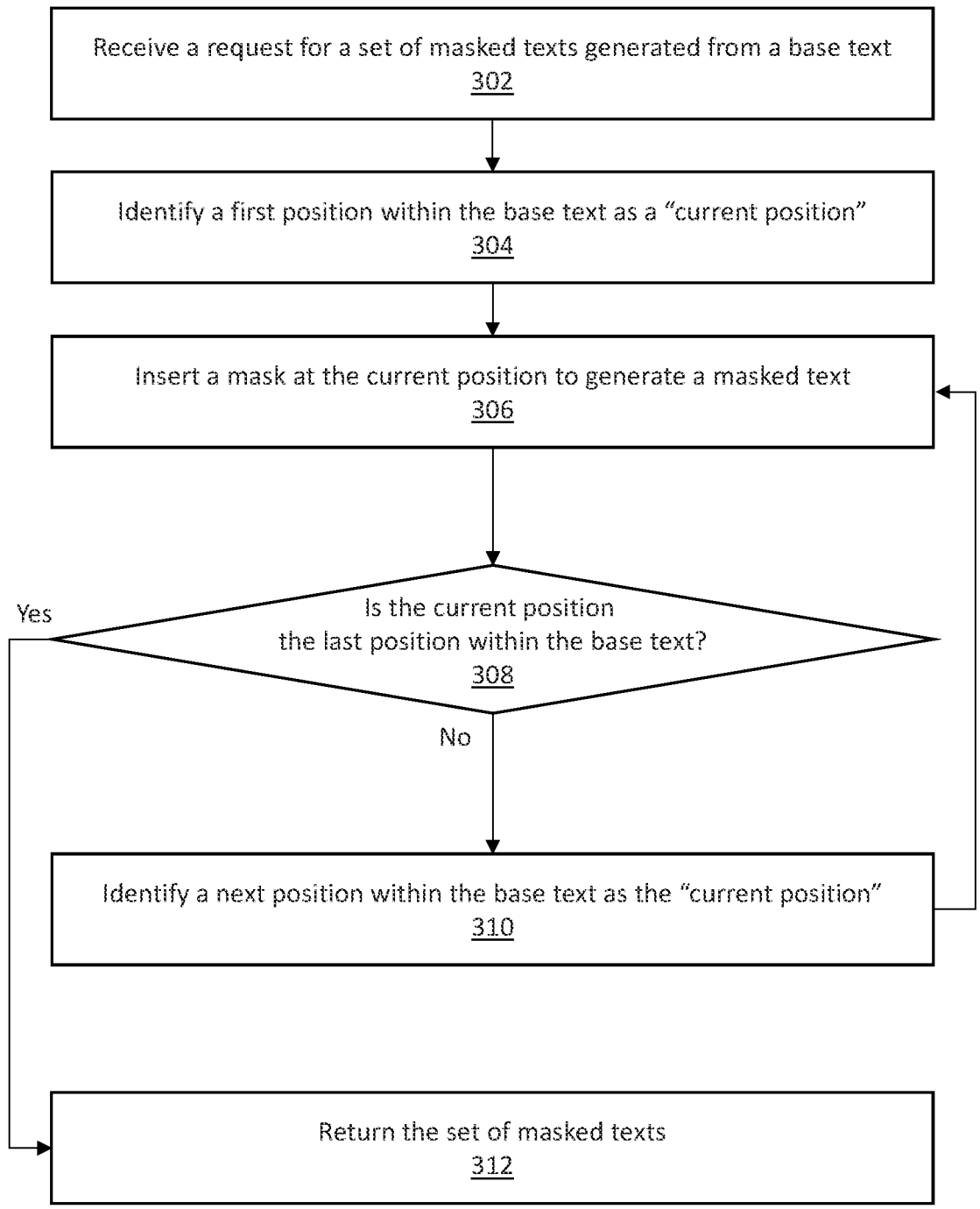
FIG. 3 illustrates an example set of operations for generating masked texts from a base text in accordance with one or more embodiments.

FIG. 3 illustrates an example set of operations for generating masked texts from a base text in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include receiving a request for a set of masked texts generated from a base text (Operation 302). A target set augmentation system receives a request for a set of masked texts generated from a base text.

In an embodiment, the target set augmentation system determines whether masked texts from the same base text were previously requested. The target set augmentation system accesses a cache memory to determine whether masked texts generated from the same base text are found. If previously-generated masked texts are found in the cache memory, then the target set augmentation may retrieve and return the masked text, without performing Operations 304-310.

One or more embodiments include identifying a first position within the base text as a "current position" (Operation 304). The target set augmentation system identifies a first position within the base text. As an example, a base text may be, "What is the time in Paris?" A target set augmentation system may identify a first position within the base text as being before the word "What." Alternatively, as another example, a base text may be, "What is the time in Paris?" Another target set augmentation system may identify a first position within the base text as being between the words "What" and "is."

One or more embodiments include inserting a mask at the current position to generate a masked text (Operation 306). The target set augmentation system inserts a mask at the current position. As an example, a base text may be, "What is the time in Paris?" A current position may be before the word "What." A target set augmentation system may generated a masked text, "<mask> What is the time in Paris?"

One or more embodiments include determining whether the current position is the last position within the base text (Operation 308). The target set augmentation system identifies a last position within the base text. As an example, a base text may be, "What is the time in Paris?" A target set augmentation system may identify a last position within the base text as being after the word "Paris." Alternatively, as another example, a base text may be, "What is the time in Paris?" Another target set augmentation system may identify a last position within the base text as being between the words "in" and "Paris."

The target set augmentation system compares the current position and the last position.

One or more embodiments include identifying a next position within the base text as the "current position" (Operation 310). The target set augmentation system increments the current position by one. As an example, a base text may be, "What is the time in Paris?" A current position may be before the word "What." A target set augmentation system increments the current position such that current position is now between the words "What" and "is."

In another embodiment, the target set augmentation system may traverse through the positions within the base text in any order, and insert masks to the different positions in any order.

If the current position is the last position within the base text, one or more embodiments include returning the set of masked texts (Operation 312). The target set augmentation system returns the set of masked texts. As an example, a base text may be, "What is the time in Paris?" A target set augmentation system may return a set of masked texts generated from the base text, as follows:

<mask> What is the time in Paris?
What <mask> is the time in Paris?
What is <mask> the time in Paris?
What is the <mask> time in Paris?
What is the time <mask> in Paris?
What is the time in <mask> Paris?
What is the time in Paris?<mask>

Figure 4:
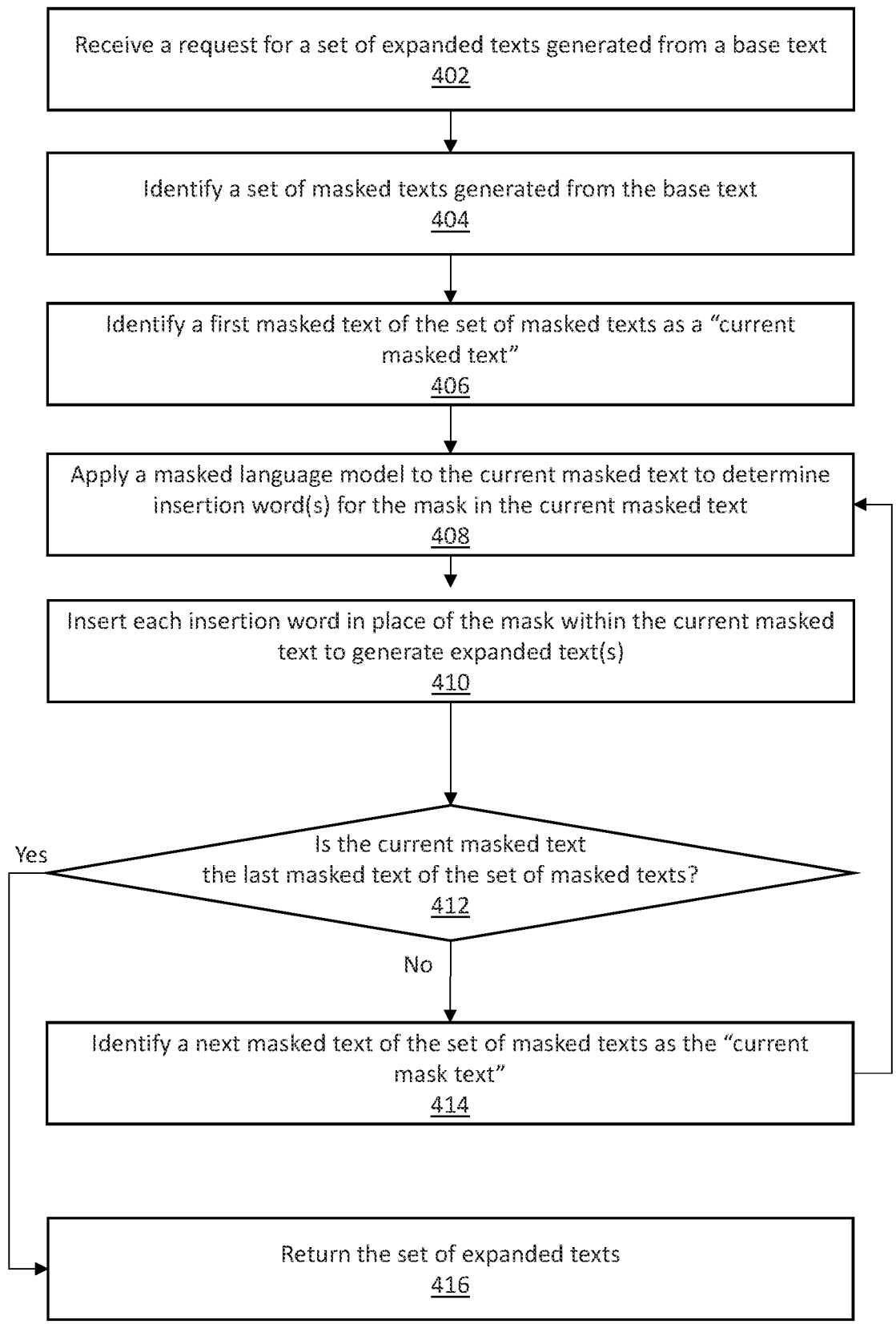
FIG. 4 illustrates an example set of operations for generating expanded texts from a base text in accordance with one or more embodiments.

FIG. 4 illustrates an example set of operations for generating expanded texts from a base text in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include receiving a request for a set of expanded texts generated from a base text (Operation 402). A target set augmentation system receives a request for a set of expanded texts generated from a base text.

In an embodiment, the target set augmentation system determines whether expanded texts from the same base text were previously requested. The target set augmentation system accesses a cache memory to determine whether expanded texts generated from the same base text are found. If previously-generated expanded texts are found in the cache memory, then the target set augmentation may retrieve and return the expanded text, without performing Operations 404-414.

One or more embodiments include identifying a set of masked texts generated from the base text (Operation 404). The target set augmentation system identifies a set of masked texts generated from the base text. Examples of operations for generating masked texts from a base text are described above with reference to FIG. 3.

One or more embodiments include identifying a first masked text of the set of masked texts as a "current masked text" (Operation 406). The target set augmentation system identifies a first masked text of the set of masked texts.

One or more embodiments include applying a masked language model to the current masked text to determine insertion word(s) for the mask in the current masked text (Operation 408). The target set augmentation system inputs the current masked text into a masked language model. The masked language model analyzes the masked text as a piece of text including a missing or obscured word, wherein the mask represents the missing or obscure word. The masked language model determines one or more candidate words that are likely to have been the missing or obscured word. The candidate words are considered as insertion words for the mask in the current masked text. As an example, a masked text may be, "What is the time <mask> in Paris?" A masked language model may output the following insertion words for the mask: now, tomorrow, currently, zone.

One or more embodiments include inserting each insertion word in place of the mask within the current masked text to generate expanded text(s) (Operation 410). The target set augmentation system inserts each insertion word in place of the mask within the current masked text to generate one or more expanded texts. As an example, a masked text may be, "What is the time <mask> in Paris?" Insertion words for the mask may be: now, tomorrow, currently, zone. A target set augmentation system may output the expanded texts:

What is the time now in Paris?
What is the time tomorrow in Paris?
What is the time currently in Paris?
What is the time zone in Paris?

One or more embodiments include determining whether the current masked text is the last masked text of the set of masked texts (Operation 412). The target set augmentation system determines whether the current masked text is the last masked text of the set of masked texts.

One or more embodiments include identifying a next masked text of the set of masked texts as the "current mask text" (Operation 414). The target set augmentation system identifies a next masked text as the "current masked text." The target set augmentation system iterates Operations 408-412 with respect to the newly-identified current masked text.

If the current masked text is the last masked text of the set of masked texts, one or more embodiments include return the set of expanded texts (Operation 416). The target set augmentation system returns the set of expanded texts. As an example, a base text me, "Next song." A target set augmentation system may return a set of expanded texts generated from the base text, as follows:

What next song.
Please next song.
Next artist song.
Next rock song.
Next song now.
Next song please.

Figure 5:
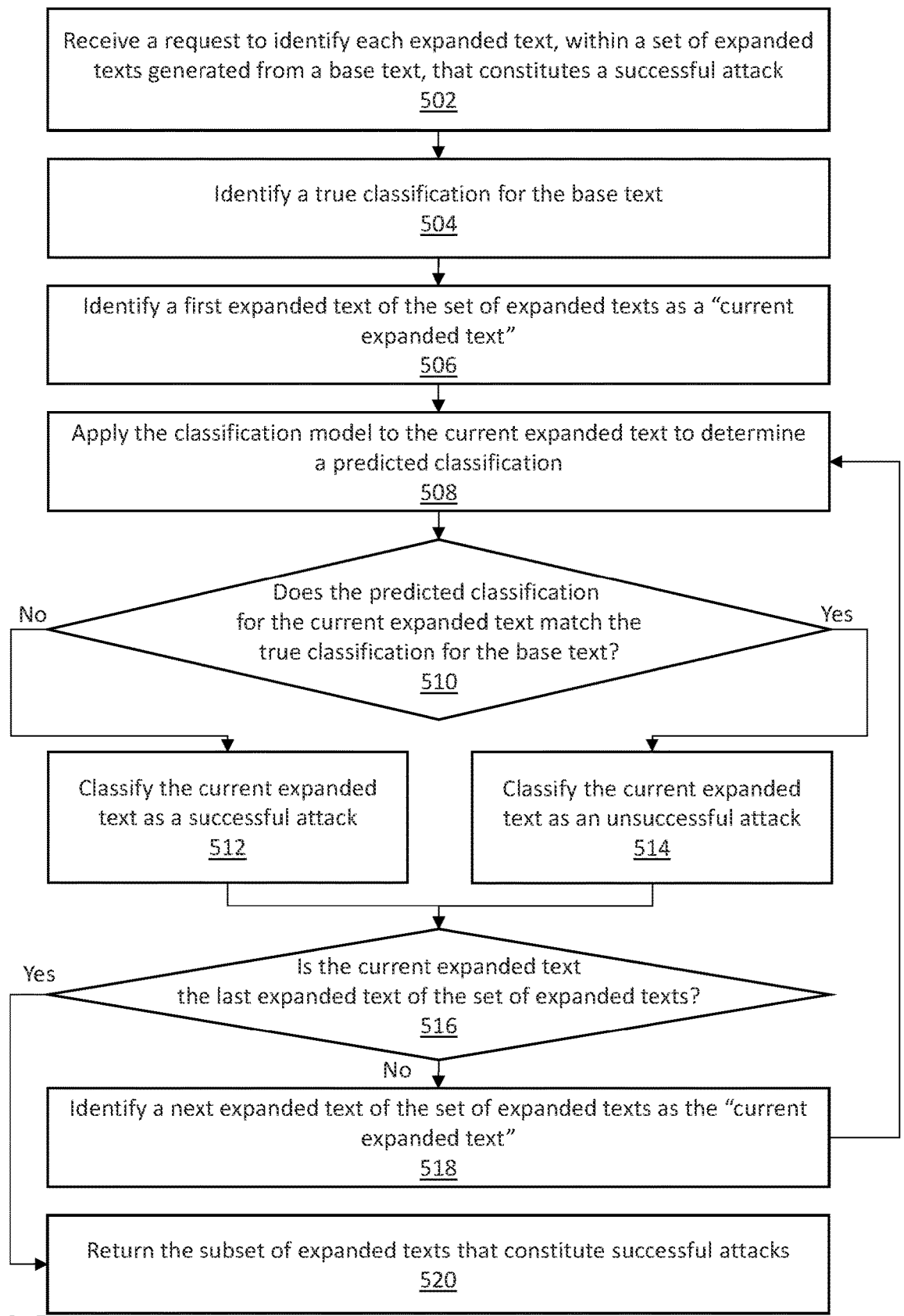
FIG. 5 illustrates an example set of operations for conditioning inclusion of an expanded text into a target set upon the expanded text's success in attacking the text classification model in accordance with one or more embodiments.

FIG. 5 illustrates an example set of operations for conditioning inclusion of an expanded text into a target set upon the expanded text's success in attacking the text classification model in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include receiving a request to identify each expanded text, within a set of expanded texts generated from a base text, that constitutes a successful attack (Operation 502). A target set augmentation system receives a request to identify each expanded text, within a set of expanded texts generated from a base text, that constitutes a successful attack on a classification model.

The set of expanded texts to be processed may include all or a subset of the expanded texts generated based on the operations of FIG. 4.

One or more embodiments include identifying a true classification for the base text (Operation 504). As described above, a target set includes texts and corresponding true classifications. The target set augmentation system identifies a true classification corresponding to the base text from which the set of expanded texts is generated.

One or more embodiments include identifying a first expanded text of the set of expanded texts as a "current expanded text" (Operation 506). The target set augmentation system identifies a first expanded text of the set of expanded texts.

One or more embodiments include applying the classification model to the current expanded text to determine a predicted classification (Operation 508). The target set augmentation system inputs the current expanded text into the classification model. The classification model outputs a predicted classification for the current expanded text.

One or more embodiments include determining whether the predicted classification for the current expanded text matches the true classification for the base text (Operation 510). The target set augmentation system compares the predicted classification for the current expanded text and the true classification for the base text.

If the predicted classification for the current expanded text does not match the true classification for the base text, one or more embodiments include classifying the current expanded text as a successful attack (Operation 512). The target set augmentation system classifies the current expanded text as a successful attack.

If the predicted classification for the current expanded text matches the true classification for the base text, one or more embodiments include classifying the current expanded text as an unsuccessful attack (Operation 514). The target set augmentation system classifies the current expanded text as an unsuccessful attack.

One or more embodiments include determining whether the current expanded text is the last expanded text of the set of expanded texts (Operation 516). The target set augmentation system determines whether the current expanded text the last expanded text of the set of expanded texts.

One or more embodiments include identifying a next expanded text of the set of expanded texts as the "current expanded text" (Operation 518). The target set augmentation system identifies a next expanded text of the set of expanded texts as the "current expanded text." The target set augmentation system iterates Operations 508-516 with respect to the newly-identified current expanded text.

If the current expanded text is the last expanded text of the set of expanded texts, one or more embodiments include returning the subset of expanded texts that constitute successful attacks (Operation 520). The target set augmentation system identifies the expanded texts that were identified as successful attacks during iterations of Operation 512. The target set augmentation system returns the expanded texts that constitute successful attacks on the classification model.

In an embodiment, the target set augmentation system adds the subset of expanded texts (that are successful attacks) into the target set of texts at Operation 212 of FIG. 2. The target set augmentation system excludes the remaining expanded texts from the target set of texts at Operation 214 of FIG. 2. In another embodiment, the target set augmentation system inputs the subset of expanded texts to the requests of Operation 602 of FIG. 6 and/or Operation 802 of FIG. 8.

Figure 6:
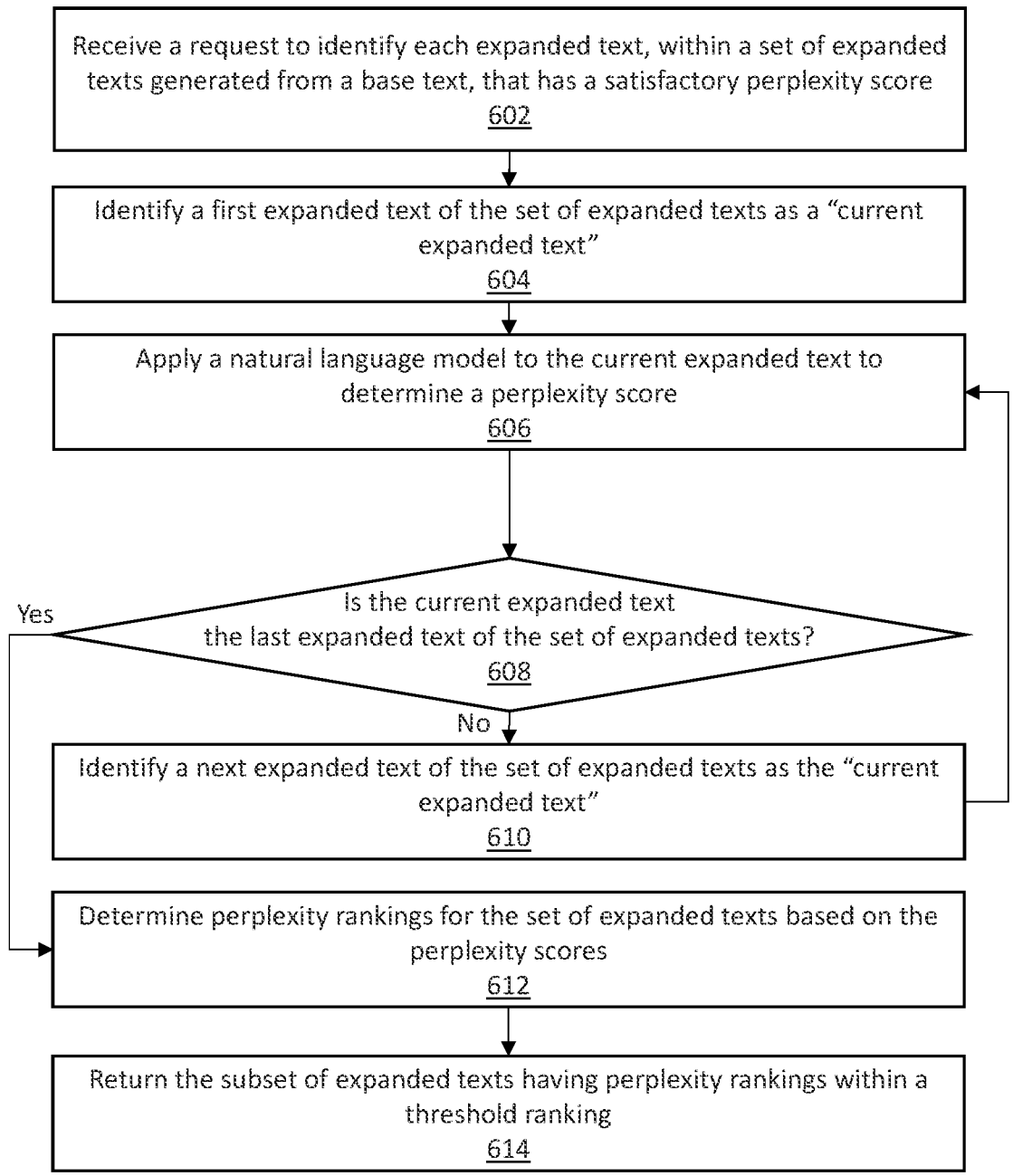
FIG. 6 illustrates an example set of operations for conditioning inclusion of an expanded text into a target set upon the expanded text's perplexity score satisfying a threshold ranking and/or threshold score in accordance with one or more embodiments.

FIG. 6 illustrates an example set of operations for conditioning inclusion of an expanded text into a target set upon the expanded text's perplexity score satisfying a threshold ranking and/or threshold score in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include receiving a request to identify each expanded text, within a set of expanded texts generated from a base text, that has a satisfactory perplexity score (Operation 602). A target set augmentation system receives a request to identify each expanded text, within a set of expanded texts generated from a base text, that has a satisfactory perplexity score. A satisfactory perplexity score may be defined as, for example, one that is associated with a perplexity ranking that is within a threshold ranking.

The set of expanded texts to be processed may include all or a subset of the expanded texts generated based on the operations of FIG. 4. In an embodiment, the set of expanded texts to be processed may include only the expanded texts satisfying the condition of being successful attacks, based on the operations of FIG. 5.

In an embodiment, the target set augmentation system determines whether expanded texts from the same base text were previously evaluated for perplexity. The target set augmentation system accesses a cache memory to determine whether a perplexity ranking and/or perplexity score of each expanded text generated from the same base text is found. If previously-determined perplexity rankings of the expanded texts are found in the cache memory, then the target set augmentation may retrieve and return the expanded texts that are within a threshold ranking, without performing Operations 604-612. Alternatively if previously-determined perplexity scores of the expanded texts are found in the cache memory, then the target set augmentation may skip Operations 604-610 and proceed with Operation 612 based on the previously-determined perplexity scores.

One or more embodiments include identifying a first expanded text of the set of expanded texts as a "current expanded text" (Operation 604). The target set augmentation system identifies a first expanded text of the set of expanded texts.

One or more embodiments include applying a natural language model to the current expanded text to determine a perplexity score (Operation 606). The target set augmentation system inputs the current expanded text into a natural language model. The natural language model outputs a perplexity score for the current expanded text.

One or more embodiments include determining whether the current expanded text is the last expanded text of the set of expanded texts (Operation 608). The target set augmentation system determines whether the current expanded text is the last expanded text of the set of expanded texts.

One or more embodiments include identifying a next expanded text of the set of expanded texts as the "current expanded text" (Operation 610). The target set augmentation system identifies a next expanded text of the set of expanded texts as the "current expanded text." In another embodiment, the target set augmentation system may traverse through the set of expanded texts in any order.

If each expanded text has been processed, one or more embodiments include determining perplexity rankings for the set of expanded texts based on the perplexity scores (Operation 612). After determining the perplexity scores of the expanded texts, the target set augmentation system ranks the expanded texts based on the perplexity scores. The smaller perplexity scores are ranked first; the larger perplexity scores are ranked last.

One or more embodiments include return the subset of expanded texts having perplexity rankings within a threshold ranking (Operation 614). The target set augmentation system identifies a threshold ranking. The target set augmentation system identifies the first ranked expanded texts within the thresholding ranking.

As an example, a threshold ranking may be 3. A set of expanded texts may be ranked as follows:

What is the time now in Paris?
What is the time zone in Paris?
What is the time tomorrow in Paris?
What is the time currently in Paris?

A target set augmentation system may identify the first three expanded texts in the above ranking. Hence, the target set augmentation system may return the following expanded texts as having perplexity rankings within the threshold ranking:

What is the time now in Paris?
What is the time zone in Paris?
What is the time tomorrow in Paris?

In another embodiment, a threshold score may be used in addition to or in lieu of a threshold ranking. As an example, a threshold ranking may be 3 and a threshold score may be 50. A set of expanded texts may be ranked as follows, with the following respective perplexity scores:

What is the time now in Paris?—23
What is the time zone in Paris?—30
What is the time tomorrow in Paris?—55
What is the time currently in Paris?—70

A target set augmentation system may identify the following expanded texts as satisfying both the threshold ranking and the threshold score:

What is the time now in Paris?
What is the time zone in Paris?

In an embodiment, the target set augmentation system adds the subset of expanded texts (that have satisfactory perplexity scores) into the target set of texts at Operation 212 of FIG. 2. The target set augmentation system excludes the remaining expanded texts from the target set of texts at Operation 214 of FIG. 2. In another embodiment, the target set augmentation system inputs the subset of expanded texts to the requests of Operation 702 of FIG. 7 and/or Operation 802 of FIG. 8.

Figure 7:
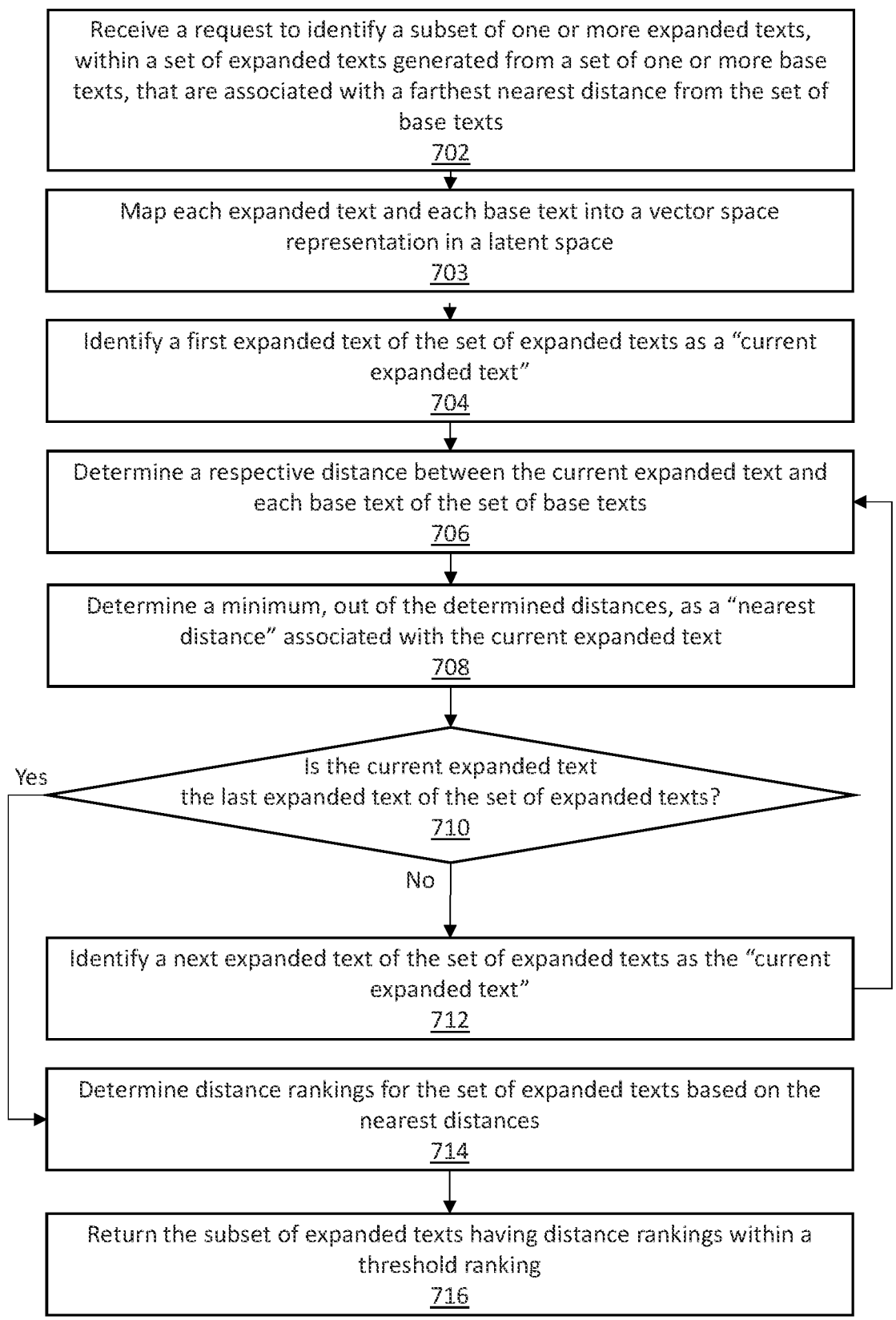
FIG. 7 illustrates an example set of operations for conditioning inclusion of an expanded text into a target set upon the expanded text having a farthest nearest distance from the existing texts currently in the target set in accordance with one or more embodiments.

FIG. 7 illustrates an example set of operations for conditioning inclusion of an expanded text into a target set upon the expanded text having a farthest nearest distance from the existing texts currently in the target set. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include receiving a request to identify a subset of one or more expanded texts, within a set of expanded texts generated from a set of one or more base texts, that are associated with a farthest nearest distance from the set of base texts (Operation 702). A target set augmentation system receives a request to identify a subset of one or more expanded texts, within a set of expanded texts generated from a set of one or more base texts, that are associated with a farthest nearest distance from the set of base texts.

The set of expanded texts to be processed may include all or a subset of the expanded texts generated based on the operations of FIG. 4. In an embodiment, the set of expanded texts to be processed may include only the expanded texts satisfying the conditions of being successful attacks and/or having satisfactory perplexity scores, based on the operations of FIGS. 5 and/or 6.

The set of expanded texts to be processed may include expanded texts generated from a single base texts or expanded texts generated multiple base texts. Where the set of expanded texts are generated from multiple base texts, the base texts may be associated with a same true classification. Expanded texts may be generated from multiple base texts by iterating the operations of FIG. 4 with respect to different base texts. The different base texts may be within a training set and/or a test set.

As an example, a training set may include:
"What is the weather?";
"Weather for today";
For the base text "What is the weather?", the following expanded texts may be generated:
"What is the weather today?";
"What is the weather here?".
For the base text "Weather for today," the following expanded texts may be generated:
"Weather for today please";
"Report weather for today."
Hence, a set of expanded texts generated from multiple base texts may include:
"What is the weather today?";
"What is the weather here?";
"Weather for today please";
"Report weather for today."

Based on the above example, a target set augmentation system may receive a request to identify a subset, from the above set of expanded texts, that are associated with a farthest nearest distance from the base texts including "What is the weather today?" and "What is the weather here?".

In an embodiment, the target set augmentation system determines whether expanded texts from the same base texts were previously evaluated for distance. The target set augmentation system accesses a cache memory to determine whether a distance ranking and/or distance associated with each expanded text is found. If previously-determined distance rankings of the expanded texts are found in the cache memory, then the target set augmentation may retrieve and return the expanded texts that are within a threshold ranking, without performing Operations 703-714. Alternatively if previously-determined distances associated with the expanded texts are found in the cache memory, then the target set augmentation may skip Operations 703-712 and proceed with Operation 714 based on the previously-determined distances.

One or more embodiments include mapping each expanded text and each base text into a vector space representation in a latent space (Operation 703). The target set augmentation system traverses through each expanded text and each base text. In a traversal of a particular text, the target set augmentation system converts each word in the text into a word vector. The target set augmentation system inputs the word vectors into a latent space model to obtain a vector space representation of the text. The latent space model may be an artificial neural network, trained via machine learning, including various layers and various weights within the various layers. The outputs from the latent space model include vector space representations of the expanded texts and the base texts.

One or more embodiments include identifying a first expanded text of the set of expanded texts as a "current expanded text" (Operation 704). The target set augmentation system identifies a first expanded text of the set of expanded texts.

One or more embodiments include determining a respective distance between the current expanded text and each base text of the set of base texts (Operation 706). The target set augmentation system determines a respective distance between the current expanded text and each base text of the set of base texts. The distance between the current expanded text and a base text is a Euclidean distance between a vector space representation of the current expanded text and a vector space representation of the base text. Additionally or alternatively, other types of distances may be used.

As an example, a set of base texts may include:
"What is the weather?";
"Weather for today";
"Where is the nearest supermarket?".

A target set augmentation system processing an expanded text, "What is the weather today?" may determine the following distances:

(a) a distance between the current expanded text "What is the weather today?" and the base text "What is the weather?";

(b) a distance between the current expanded text "What is the weather today?" and the base text "Weather for today";

(c) a distance between the current expanded text "What is the weather today?" and the base text "Where is the nearest supermarket?".

One or more embodiments include determining a minimum, out of the determined distances, as a "nearest distance" associated with the current expanded text (Operation 708). The target set augmentation system determines a minimum out of the distances determined at Operation 706. The minimum constitutes a "nearest distance" associated with the current expanded text. The target set augmentation system records and/or stores the "nearest distance" associated with the current expanded text.

In an optional embodiment, the set of expanded text identified at Operation 702 is generated from a single base text. Then at Operation 706, a single distance is determined—the distance between the current expanded text and the single base text. Hence, Operation 708 may be skipped.

One or more embodiments include determining whether the current expanded text is the last expanded text of the set of expanded texts (Operation 710). The target set augmentation system determines whether the current expanded text is the last expanded text of the set of expanded texts.

One or more embodiments include identifying a next expanded text of the set of expanded texts as the "current expanded text" (Operation 712). The target set augmentation system identifies a next expanded text of the set of expanded texts as the "current expanded text." In another embodiment, the target set augmentation system may traverse through the set of expanded texts in any order.

If each expanded text has been processed, one or more embodiments include determining distance rankings for the set of expanded texts based on the nearest distances (Operation 714). After determining the nearest distances associated with the expanded texts, the target set augmentation system ranks the expanded texts based on the nearest distances. The larger nearest distances are ranked first; the smaller nearest distances are ranked last.

One or more embodiments include returning the subset of expanded texts having distance rankings within a threshold ranking (Operation 716). The target set augmentation system identifies a threshold ranking. The target set augmentation system identifies the first ranked expanded texts within the thresholding ranking.

As an example, a threshold ranking may be 2. A set of expanded texts may be ranked as follows:
What is the time now in Paris? (distance 0.45)
What is the time currently in Paris? (distance 0.55)
What is the time tomorrow in Paris? (distance 1.81)
What is the time zone in Paris? (distance 2.55)

A target set augmentation system may identify the first two expanded texts in the above ranking. Hence, the target set augmentation system may return the following expanded texts as having distance rankings within the threshold ranking:
What is the time now in Paris?
What is the time currently in Paris?

In an embodiment, the target set augmentation system adds the subset of expanded texts (that have distance rankings within the threshold ranking) into the target set of texts at Operation 212 of FIG. 2. The target set augmentation system excludes the remaining expanded texts from the target set of texts at Operation 214 of FIG. 2. In another embodiment, the target set augmentation system inputs the subset of expanded texts to the request of Operation 802 of FIG. 8.

Figure 8:
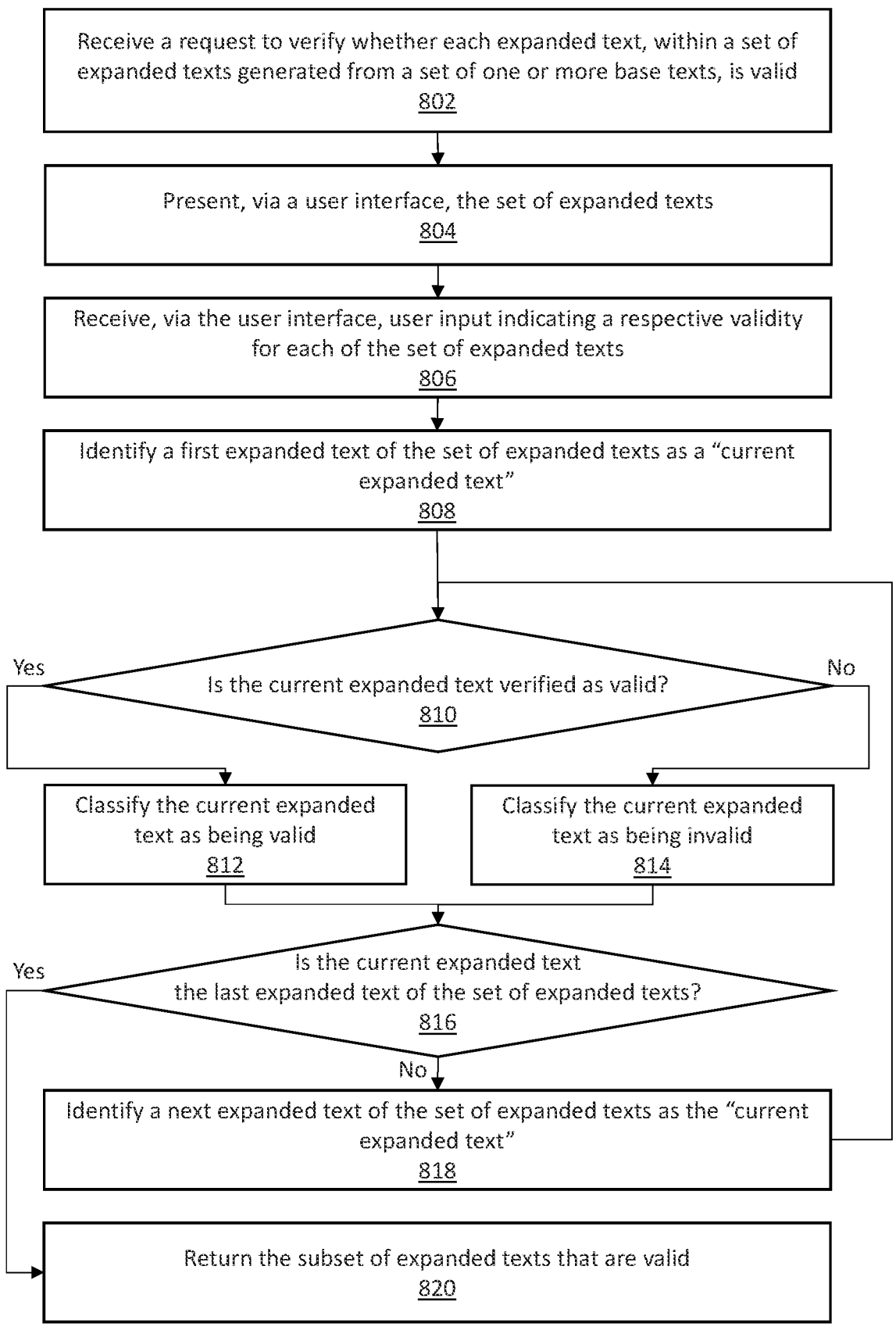
FIG. 8 illustrates an example set of operations for conditioning inclusion of an expanded text into a target set upon the expanded text's validity as verified by a user and/or other means in accordance with one or more embodiments.

FIG. 8 illustrates an example set of operations for conditioning inclusion of an expanded text into a target set upon the expanded text's validity as verified by a user and/or other means, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include receiving a request to verify whether each expanded text, within a set of expanded texts generated from a set of one or more base texts, is valid (Operation 802). A target set augmentation system receive a request to verify whether each expanded text, within a set of expanded texts generated from a set of one or more base texts, is valid.

The set of expanded texts to be processed may include all or a subset of the expanded texts generated based on the operations of FIG. 4. In an embodiment, the set of expanded texts to be processed may include only the expanded texts satisfying the conditions of being successful attacks and/or having satisfactory perplexity scores and/or having farthest nearest distances, based on the operations of FIGS. 5 and/or 6 and/or 7.

In an embodiment, the target set augmentation system determines whether expanded texts from the same base texts were previously evaluated for validity. The target set augmentation system accesses a cache memory to determine whether a validity of each expanded text generated from the same base text is found. If previously-determined validities of the expanded texts are found in the cache memory, then the target set augmentation may retrieve and return the expanded texts that are valid, without performing Operations 804-818.

One or more embodiments include presenting, via a user interface, the set of expanded texts (Operation 804). The target set augmentation system presents, via a user interface, the set of expanded texts. The set of expanded texts may be presented concurrently and/or serially.

One or more embodiments include receive, via the user interface, user input indicating a respective validity for each of the set of expanded texts (Operation 806). The target set augmentation system presents, via the user interface, user interface elements configured to receive user input indicating a respective validity for each of the set of expanded texts. The target set augmentation system receives the user input.

One or more embodiments include identifying a first expanded text of the set of expanded texts as a "current expanded text" (Operation 808). The target set augmentation system identifies a first expanded text of the set of expanded texts as a "current expanded text."

One or more embodiments include determining whether the current expanded text is verified as valid (Operation 810). The target set augmentation system determines whether the current expanded text is verified as valid. An expanded may be determined as valid if (a) the expanded text is a well-formed statement, and (b) the expanded text is associated with a same classification as the base text from which the expanded text was generated.

As an example, a base text may be "What is the time in Paris?" A true classification may be "Time Inquiry," indicating that the intent of the statement is to inquire about the time. A set of expanded texts may include:
What is the time now in Paris?
What is the time tomorrow in Paris?
What is the time zone in Paris?

A user may determine that "What is the time now in Paris" is well-formed and associated with the same classification, "Time Inquiry." Hence, the user may indicate that "What is the time now in Paris?" is valid.

The user may determine that "What is the time tomorrow in Paris" is not well-formed. Hence, the user may indicate that "What is the time tomorrow in Paris?" is invalid.

The user may determine that "What is the time zone in Paris" is well-formed but is associated with a different classification, "Time Zone Inquiry." Hence, the user may indicate that "What is the time zone in Paris?" is invalid.

In an embodiment, additional and/or alternative methods of verifying the validity of the current expanded text may be used. As an example, another application and/or model may be used to check the grammar of an expanded text.

If the current expanded text is verified as valid, one or more embodiments include classifying the current expanded text as being valid (Operation 812). The target set augmentation system classifies the current expanded text as being valid.

If the current expanded text is not verified as valid, one or more embodiments include classifying the current expanded text as being invalid (Operation 814). The target set augmentation system classifies the current expanded text as being invalid.

One or more embodiments include determining whether the current expanded text is the last expanded text of the set of expanded texts (Operation 816). The target set augmentation system determines whether the current expanded text is the last expanded text of the set of expanded texts.

One or more embodiments include identifying a next expanded text of the set of expanded texts as the "current expanded text" (Operation 818). The target set augmentation system identifies a next expanded text of the set of expanded texts as the "current expanded text." The target set augmentation system iterates Operations 810-816 with respect to the newly-identified current expanded text.

If each expanded text has been processed, one or more embodiments include returning the subset of expanded texts that are valid (Operation 820). The target set augmentation system identifies the expanded texts that were classified as valid during iterations of Operation 812. The target set augmentation system returns the expanded texts that are valid.

In an embodiment, the target set augmentation system adds the subset of expanded texts (that are verified as valid) into the target set of texts at Operation 212 of FIG. 2. The target set augmentation system excludes the remaining expanded texts from the target set of texts at Operation 214 of FIG. 2.

Figure 9A:
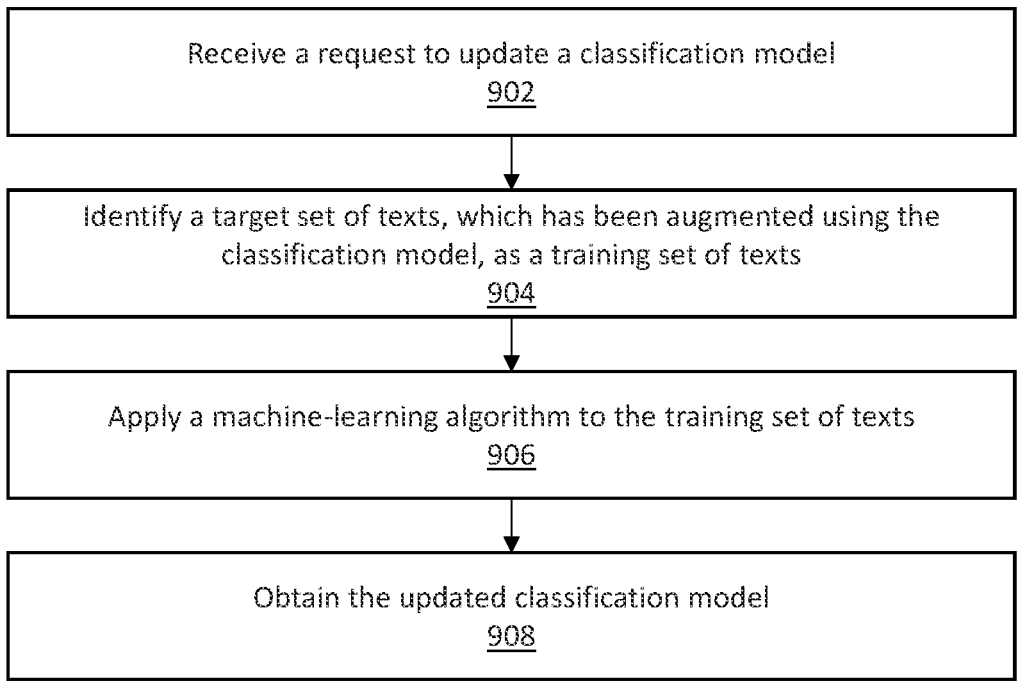
FIG. 9A illustrates an example set of operations for training and/or updating a classification model based on an augmented training set of texts in accordance with one or more embodiments.

4. Training and/or Testing a Text Classification Model Using an Augmented Set of Texts FIG. 9A illustrates an example set of operations for training and/or updating a classification model based on an augmented training set of texts in accordance with one or more embodiments. One or more operations illustrated in FIG. 9A may be modified, rearranged, or omitted all together. Accordingly, the particular sequence of operations illustrated in FIG. 9A should not be construed as limiting the scope of one or more embodiments.

One or more embodiments include receiving a request to update a classification model (Operation 902). A machine learning system receives a request to update a classification model.

One or more embodiments include identifying a target set of texts, which has been augmented using the classification model, as a training set of texts (Operation 904). The machine learning system identifies an augmented target set of texts. The augmented target set of texts may be generated based on operations described above with reference to FIG. 2.

In an embodiment, the same classification model that is used at Operation 508 of FIG. 5 for determining whether an expanded text constitutes a successful attack is being trained based on the operations of FIG. 9A. In another embodiment, a classification model, other than the one being trained based on the operations of FIG. 9A, is used at Operation 508 of FIG. 5 for determining whether an expanded text constitutes a successful attack. In yet another embodiment, the augmented target set of texts is generated without use of any classification model.

One or more embodiments include applying a machine-learning algorithm to the training set of texts (Operation 906). The machine learning system applies a machine-learning algorithm to the training set of texts. The machine-learning algorithm attempts to determine a new classification model that best maps the texts of the training set to the corresponding true classifications of the training set.

One or more embodiments include obtaining the updated classification model (Operation 908). The machine learning system obtains the updated classification model.

Figure 9B:
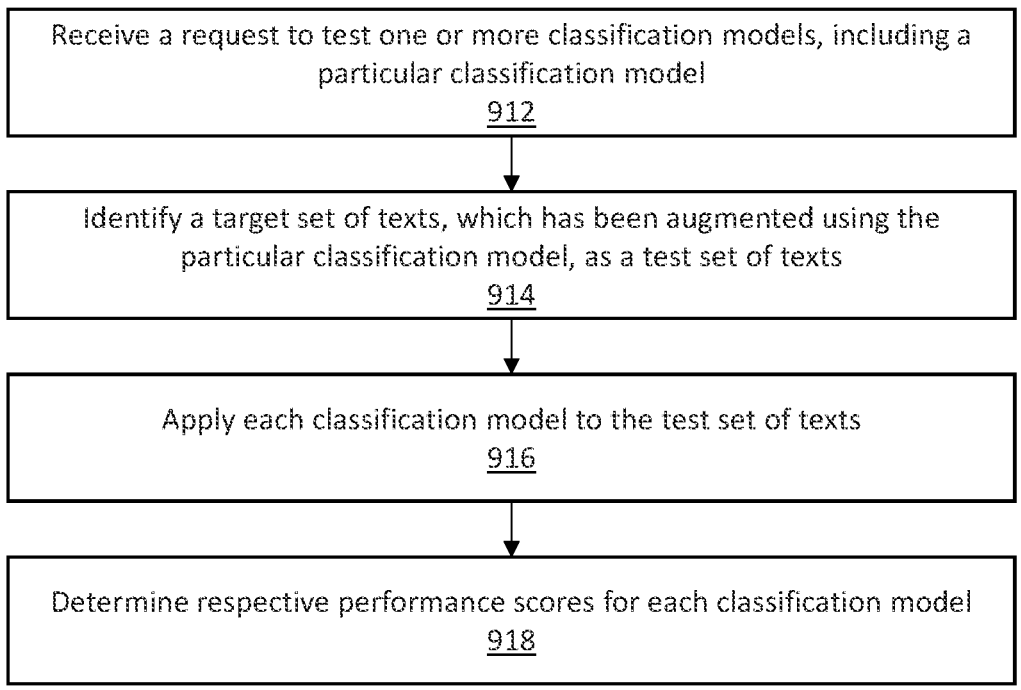
FIG. 9B illustrates an example set of operations for testing a classification model based on an augmented test set of texts in accordance with one or more embodiments.

FIG. 9B illustrates an example set of operations for testing a classification model based on an augmented test set of texts in accordance with one or more embodiments. One or more operations illustrated in FIG. 9B may be modified, rearranged, or omitted all together. Accordingly, the particular sequence of operations illustrated in FIG. 9B should not be construed as limiting the scope of one or more embodiments.

One or more embodiments include receiving a request to test one or more classification models, including a particular classification model (Operation 912). A test system receives a request to test one or more classification models, including a particular classification model.

One or more embodiments include identifying a target set of texts, which has been augmented using the particular classification model, as a test set of texts (Operation 914). The test system identifies an augmented target set of texts. The augmented target set of texts may be generated based on operations described above with reference to FIG. 2.

In an embodiment, the same classification model that is used at Operation 508 of FIG. 5 for determining whether an expanded text constitutes a successful attack is one that is being evaluated based on the operations of FIG. 9B. In another embodiment, a classification model, other than the one being evaluated based on the operations of FIG. 9B, is used at Operation 508 of FIG. 5 for determining whether an expanded text constitutes a successful attack. In yet another embodiment, the augmented target set of texts is generated without use of any classification model.

One or more embodiments include applying each classification model to the test set of texts (Operation 916). The test system applies each classification model to the test set. Each classification model outputs a predicted classification for each text in the test set.

One or more embodiments include determining respective performance scores for each classification model (Operation 918). The test system compares the predicted classifications and the true classifications for the texts in the test set. The test system determines respective performance scores for each classification model based on an accuracy, precision, recall, and/or other performance metric.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

In an example, a training set includes a set of base texts and corresponding labels indicating true classifications:
Weather Inquiry: "What is the weather?";
Weather Inquiry: "Weather for today";
Location Inquiry: "What is the address for the supermarket?"

A target set augmentation system applies a mask insertion algorithm to each base text and obtains masked texts, for example:
"<mask> What is the weather?";
"What <mask> is the weather?";
"What is <mask> the weather?";
"Weather <mask> for today";
"Weather for <mask> today";
"What is the address for <mask> the supermarket?"
"What is the address for the <mask> supermarket?"
"What is the address for the supermarket <mask>?"

Hence, a mask is inserted into each position within each base text.

The target set augmentation system applies a masked language model to each masked text and obtains expanded texts, for example:
"Wondering, what is the weather?";
"Banging, what is the weather?";
"What about is the weather?";
"What is now the weather?";
"What is there the weather?";
"Weather please for today";
"Weather forecast for today";
"Weather for Chicago today";
"What is the address for Freeze the supermarket?";
"What is the address for the nearest supermarket?";
"What is the address for the closest supermarket?";
"What is the address for the Asian supermarket?";
"What is the address for the supermarket here?".

Hence, a predicted word replaces the mask in each masked text. More than one predicted word may replace the mask in a masked text to each generate a corresponding expanded text. The set of expanded text has been generated from multiple base texts in the target set.

The target set augmentation system applies a classification model to each expanded text. The target set augmentation system determines the following classifications for the expanded texts:
Weather Inquiry: "Wondering, what is the weather?";
Location Inquiry: "Banging, what is the weather?";
Location Inquiry: "What about is the weather?";
Weather Inquiry: "What is now the weather?";
Location Inquiry: "What is there the weather?";
Weather Inquiry: "Weather please for today";
Location Inquiry: "Weather forecast for today";
Location Inquiry: "Weather for Chicago today";
Weather Inquiry: "What is the address for Freeze the supermarket?";
Location Inquiry: "What is the address for the nearest supermarket?".
Weather Inquiry: "What is the address for the closest supermarket?";
Weather Inquiry: "What is the address for the Asian supermarket?";
Weather Inquiry: "What is the address for the supermarket here?".

The target set augmentation system determines whether each expanded text is classified differently from the true classification of the base text from which the expanded text is generated. An expanded text that is classified differently constitutes a successful attack on the classification model. The target set augmentation system determines that the following expanded texts constitute successful attacks:
Location Inquiry: "Banging, what is the weather?";
Location Inquiry: "What about is the weather?";
Location Inquiry: "What is there the weather?";
Location Inquiry: "Weather forecast for today";
Location Inquiry: "Weather for Chicago today";
Weather Inquiry: "What is the address for Freeze the supermarket?";
Weather Inquiry: "What is the address for the closest supermarket?";
Weather Inquiry: "What is the address for the Asian supermarket?";
Weather Inquiry: "What is the address for the supermarket here?".

The target set augmentation system applies a natural language model to the expanded texts that are successful attacks to determine perplexity scores. The target set augmentation system ranks the expanded texts based on perplexity scores, with lowest being first in the ranking. The target set augmentation system may separately rank expanded texts generated from different base texts. The threshold ranking is 2.

For successful expanded texts generated from "What is the weather?", the target set augmentation system obtains the following ranking of expanded texts:
"What about is the weather?";
"Banging, what is the weather?";
"What is there the weather?".

The target set augmentation system selects the first two expanded texts in the ranking. The target set augmentation system therefore selects:
"What about is the weather?";
"Banging, what is the weather?".

For successful expanded texts generated from "Weather for today," the target set augmentation system obtains the following ranking of expanded texts:
"Weather for Chicago today";
"Weather forecast for today."

The target set augmentation system selects the first two expanded texts in the ranking. The target set augmentation system therefore selects:
"Weather for Chicago today";
"Weather forecast for today."

For successful expanded texts generated from "What is the address for the supermarket?", the target set augmentation system obtains the following ranking of expanded texts:
"What is the address for the closest supermarket?";

"What is the address for the Asian supermarket?";
"What is the address for the supermarket here?";
"What is the address for Freeze the supermarket?".

The target set augmentation system selects the first two expanded texts in the ranking. The target set augmentation system therefore selects:
"What is the address for the closest supermarket?";
"What is the address for the Asian supermarket?".

Hence, the successful expanded texts associated with satisfactory perplexity are:
"What about is the weather?";
"Banging, what is the weather?";
"Weather for Chicago today";
"Weather forecast for today";
"What is the address for the closest supermarket?";
"What is the address for the Asian supermarket?".

The target set augmentation system applies a farthest nearest model to each of the successful expanded texts associated with satisfactory perplexity. For the sake of simplicity, the example focuses on the expanded texts "What about is the weather?" and "Banging, what is the weather?".

The target set augmentation system converts each word in "What about is the weather?" into a word vector. The target set augmentation system inputs the word vectors into a latent space model. The target set augmentation system obtains a vector space representation of "What about is the weather?". Similarly, the target set augmentation system obtains a vector space representation of each successful expanded text associated with satisfactory perplexity and each base text in the target set.

The target set augmentation system determines Euclidean distances between the vector space representation of the expanded text "What about is the weather?" and the vector space representation of each base text. The distances may be, for example:
Between "What about is the weather?" and "What is the weather?": 0.3;
Between "What about is the weather?" and "Weather for today": 2.3
Between "What about is the weather?" and "What is the address for the supermarket?": 6.3

The target set augmentation system determines that the minimum distance, out of the above distances, is 0.3." Therefore the target set augmentation system records "0.3" as the "nearest distance" associated with "What about is the weather?"

Similarly, the target set augmentation system determines the "nearest distance" for each expanded text. The following nearest distances may be found:
0.3 for "What about is the weather?"
0.4 for "Banging, what is the weather?";
0.4 for "Weather for Chicago today";
0.5 for "Weather forecast for today";
0.2 for "What is the address for the closest supermarket?";
0.6 for "What is the address for the Asian supermarket?".

The target set augmentation system ranks the expanded texts based on distances, with greatest being first in the ranking. The target set augmentation system may separately rank expanded texts generated from base texts belonging to different true classifications. The threshold ranking is 3.

The target set augmentation system obtains the following ranking for expanded texts generated from base texts associated with a true classification of Weather Inquiry:
"Weather forecast for today";
"Banging, what is the weather?";
"Weather for Chicago today";
"What about is the weather?".

The target set augmentation system selects the first three from the above ranking. Therefore the target set augmentation system selects:
"Weather forecast for today";
"Banging, what is the weather?";
"Weather for Chicago today".

The target set augmentation system obtains the following ranking for expanded texts generated from base texts associated with a true classification of Location Inquiry:
"What is the address for the Asian supermarket?";
"What is the address for the closest supermarket?".

The target set augmentation system selects the first three from the above ranking. Since the number of expanded texts that have satisfied the inclusion criteria thus far is only two, the target set augmentation system selects all expanded texts:
"What is the address for the Asian supermarket?";
"What is the address for the closest supermarket?".

The target set augmentation system presents, via a validity verification user interface, each of the expanded texts that have satisfied the inclusion criteria thus far, including:
"Weather forecast for today";
"Banging, what is the weather?";
"Weather for Chicago today";
"What is the address for the Asian supermarket?";
"What is the address for the closest supermarket?".

The target set augmentation system receives, via the validity verification user interface, user verification indicating which expanded texts are valid. The user may indicate that the following expanded texts are valid:
"Weather forecast for today";
"Weather for Chicago today";
"What is the address for the Asian supermarket?";
"What is the address for the closest supermarket?".

The target set augmentation system augments the target set with the valid expanded texts. The target set augmentation system does not augment the target set with any expanded texts that were not selected due to failure to satisfy the above inclusion criteria. During augmentation, the target set augmentation system adds a label to each expanded text indicating the true classification of the base text from which the expanded text was generated. Focusing on the expanded text, "Weather forecast for today," the target set augmentation system determines that the base text from which the expanded text was generated is "Weather for today." Since the true classification for "Weather for today" is Weather Inquiry, the target set augmentation system labels "Weather forecast for today" with a true classification of Weather Inquiry.

Therefore after augmentation, the target set now includes the following as base text, with the following true classifications:
Weather Inquiry: "What is the weather?";
Weather Inquiry: "Weather for today";
Location Inquiry: "What is the address for the supermarket?"
Weather Inquiry: "Weather forecast for today";
Weather Inquiry: "Weather for Chicago today";
Location Inquiry: "What is the address for the Asian supermarket?";
Location Inquiry: "What is the address for the closest supermarket?".

The augmented target set may be used to retrain the classification model via machine learning. Additionally or alternatively the augmented target set may be used to evaluate the classification model.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media comprising instructions, which when executed by one or more hardware processors, cause performance of operations, comprising:
    generating a training set of texts for training a machine-learned classification model, wherein generating the training set of texts comprises:
        generating a set of expanded texts,
            wherein a first expanded text, of the set of expanded texts, corresponds to a first masked text of a set of masked texts,
                wherein the first masked text, of the set of masked texts, comprises at least one mask,
            wherein the first expanded text is generated from the first masked text at least by inserting one or more insertion words in place of the first masked text,
            wherein the first masked text corresponds to a first base text of a set of base texts,
            wherein the first masked text is generated from the first base text at least by inserting the at least one mask at a first position within the first base text;
    applying the machine-learned classification model to a second expanded text, of the set of expanded texts, to determine a first predicted classification for the second expanded text;
    comparing the first predicted classification to a first true classification of a second base text corresponding to the second expanded text;
    determining that the first predicted classification corresponding to the second expanded text differs from the first true classification of the second base text;
    applying a natural language model to the second expanded text to determine a probability of encountering the second expanded text in real-world data, wherein the real-world data comprises grammatically correct text;
    determining that the second expanded text meets a threshold probability of being encountered in the real-world data;
    including the second expanded text in the training set of texts based at least on (a) the first predicted classification differing from the first true classification and (b) the second expanded text meeting the threshold probability of being encountered in the real-world data;
    training the machine-learned classification model at least by applying a machine-learning algorithm to the training set of texts.

2. The one or more media of claim 1, wherein applying the natural language model to the second expanded text to determine the probability of encountering the second expanded text in the real-world data comprises:
    determining a ranking of the probability of encountering the second expanded text in the real-world data,
        wherein the ranking is determined relative to the set of expanded texts, and
        wherein a relatively lower ranking of a respective expanded text represents a relatively higher probability of encountering the respective expanded text in the real-world data;
    determining that the second expanded text is within a threshold ranking;
    including the second expanded text in the training set of texts based at least on the second expanded text being within the threshold ranking.

3. The one or more media of claim 1, wherein the operations further comprise:
    determining that a third expanded text, of the set of expanded texts, is below the threshold probability of being encountered in the real-world data;
    excluding the third expanded text from the training set of texts based at least on the third expanded text being below the threshold probability of being encountered in the real-world data.

4. The one or more media of claim 1, wherein the operations further comprise:
    determining a first nearest distance value between the second expanded text and the second base text corresponding to the second expanded text;
    determining that the first nearest distance value is within a nearest distance threshold;
    including the second expanded text in the training set of texts based at least on the first nearest distance value between the second expanded text and the second base text being within the nearest distance threshold.

5. The one or more media of claim 4, wherein the operations further comprise:
   determining a second nearest distance value between a third expanded text and a third base text corresponding to the third expanded text;
   determining that the second nearest distance value is outside the nearest distance threshold; and
   excluding the third expanded text from the training set of texts based at least on the second nearest distance value between the third expanded text and the third base text being outside the nearest distance threshold.

6. The one or more media of claim 1, wherein the operations further comprise:
   subsequent to applying the natural language model:
      determining a first validity input corresponding to a third expanded text, of the set of expanded texts,
      wherein the first validity input is based on a user input from a user interface element;
      determining that the first validity input corresponding to the third expanded text indicates that the third expanded text is invalid;
   wherein the third expanded text meets the threshold probability of being encountered in the real-world data; and
   excluding the third expanded text from the training set of texts, based at least on the first validity input corresponding to the third expanded text indicating that the third expanded text is invalid.

7. The one or more media of claim 6, wherein the operations further comprise:
   determining a second validity input corresponding to a fourth expanded text, of the set of expanded texts;
   determining that the second validity input corresponding to the fourth expanded text indicates that the fourth expanded text is valid;
   wherein the fourth expanded text meets the threshold probability of being encountered in the real-world data; and
   including the fourth expanded text in the training set of texts based at least on the second validity input corresponding to the fourth expanded text indicating that the fourth expanded text is valid.

8. The one or more media of claim 1, wherein the operations further comprise:
   determining the second base text,
      wherein the second base text is received from, or determined based on, a user input from a user interface element.

9. The one or more media of claim 1, wherein the training set of texts comprises:
   the second expanded text wherein the second expanded text comprises:
      a second base word, corresponding to the second base text, and
      a second insertion word,
      wherein the second base word precedes the second insertion word in the second expanded text; and
   a third expanded text, of the set of expanded texts, wherein the third expanded text comprises:
      a third base word, corresponding to a third base text, and
      a third insertion word,
      wherein the third insertion word precedes the third base word in the third expanded text.

10. The one or more media of claim 1, wherein generating the training set of texts further comprises further comprise:
    determining that a number of expanded texts included in the training set of texts is below a threshold value;
    responsive to determining that the number of expanded texts included in the training set of texts is below the threshold value:
       generating an additional set of expanded texts;
       applying the natural language model to a third expanded text, of the additional set of expanded texts, to determine, for the third expanded text, the probability of encountering the third expanded text in the real-world data;
       determining that the third expanded text meets the threshold probability of being encountered in the real-world data;
       including the third expanded text in the training set of texts based at least on the third expanded text meeting the threshold probability of being encountered in the real-world data.

11. The one or more media of claim 1,
    wherein generating the training set of texts comprises:
       selecting the second base text from a first training set of texts; and
    wherein including the second expanded text in the training set of texts comprises:
       augmenting the first training set of texts at least by including the second expanded text in the first training set of texts.

12. The one or more media of claim 1, wherein the operations further comprise:
    applying the machine-learned classification model to a third expanded text to determine a second predicted classification for the third expanded text;
    comparing the second predicted classification to a second true classification of a third base text corresponding to the third expanded text;
    determining that the second predicted classification matches the second true classification;
    excluding the third expanded text from the training set of texts, based at least on the second predicted classification corresponding to the third expanded text matching the second true classification of the third base text corresponding to the third expanded text,
       wherein the third expanded text meets the threshold probability of being encountered in the real-world data.

13. A method, comprising:
    generating a training set of texts for training a machine-learned classification model, wherein generating the training set of texts comprises:
       generating a set of expanded texts,
          wherein a first expanded text, of the set of expanded texts, corresponds to a first masked text of a set of masked texts,
             wherein the first masked text, of the set of masked texts, comprises at least one mask,
          wherein the first expanded text is generated from the first masked text at least by inserting one or more insertion words in place of the first masked text,
          wherein the first masked text corresponds to a first base text of a set of base texts,
          wherein the first masked text is generated from the first base text at least by inserting the at least one mask at a first position within the first base text;

applying the machine-learned classification model to a second expanded text, of the set of expanded texts, to determine a first predicted classification for the second expanded text;

comparing the first predicted classification to a first true classification of a second base text corresponding to the second expanded text;

determining that the first predicted classification corresponding to the second expanded text differs from the first true classification of the second base text;

applying a natural language model to the second expanded text to determine a probability of encountering the second expanded text in real-world data, wherein the real-world data comprises grammatically correct text;

determining that the second expanded text meets a threshold probability of being encountered in the real-world data;

including the second expanded text in the training set of texts based at least on (a) the first predicted classification differing from the first true classification and (b) the second expanded text meeting the threshold probability of being encountered in the real-world data;

training the machine-learned classification model at least by applying a machine-learning algorithm to the training set of texts;

wherein the method is performed by at least one hardware processor.

14. The method of claim 13, further comprising:

applying the machine-learned classification model to a third expanded text to determine a second predicted classification for the third expanded text;

comparing the second predicted classification to a second true classification of a third base text corresponding to the third expanded text;

determining that the second predicted classification corresponding to the third expanded text matches the second true classification;

excluding the third expanded text from the training set of texts, based at least on the second predicted classification corresponding to the third expanded text matching the second true classification of the third base text corresponding to the third expanded text, wherein the third expanded text meets the threshold probability of being encountered in the real-world data.

15. One or more non-transitory computer-readable media comprising instructions, which when executed by one or more hardware processors, cause performance of operations, comprising:

generating a test set of texts for testing a first machine-learned classification model, wherein generating the test set of texts comprises:

generating a set of expanded texts, wherein a first expanded text, of the set of expanded texts, corresponds to a first masked text of a set of masked texts, wherein the first masked text, of the set of masked texts, comprises at least one mask, wherein the first expanded text is generated from the first masked text at least by inserting one or more insertion words in place of the first masked text, wherein the first masked text corresponds to a first base text of a set of base texts, wherein the first masked text is generated from the first base text at least by inserting the at least one mask at a first position within the first base text;

applying a second machine-learned classification model to a second expanded text to determine a first predicted classification for the second expanded text;

comparing the first predicted classification to a first true classification of a second base text corresponding to the second expanded text;

determining that the first predicted classification corresponding to the second expanded text differs from the first true classification of the second base text;

applying a natural language model to the second expanded text to determine a probability of encountering the second expanded text in real-world data, wherein the real-world data comprises grammatically correct text;

determining that the second expanded text meets a threshold probability of being encountered in the real-world data;

including the second expanded text in the test set of texts based at least on (a) the first predicted classification differing from the first true classification and (b) the second expanded text meeting the threshold probability of being encountered in the real-world data;

applying the first machine-learned classification model to the test set of texts to determine a performance score for the first machine-learned classification model.

16. The one or more media of claim 15, wherein the performance score is determined based on at least one of: accuracy, precision, or recall.

17. The one or more media of claim 15, wherein the operations further comprise:

applying the second machine-learned classification model to a third expanded text to determine a second predicted classification for the third expanded text;

comparing the second predicted classification to a second true classification of a third base text corresponding to the third expanded text;

determining that the second predicted classification corresponding to the third expanded text matches the second true classification;

excluding the third expanded text from the test set of texts, based at least on the second predicted classification corresponding to the third expanded text matching the second true classification of the third base text corresponding to the third expanded text, wherein the third expanded text meets the threshold probability of being encountered in the real-world data.

18. The one or more media of claim 15, wherein applying the natural language model to the second expanded text to determine the probability of encountering the second expanded text in the real-world data comprises:

determining a ranking of the probability of encountering the second expanded text in the real-world data, wherein the ranking is determined relative to the set of expanded texts, and wherein a relatively lower ranking of a respective expanded text represents a relatively higher probability of encountering the respective expanded text in the real-world data;

determining that the second expanded text is within a threshold ranking;

including the second expanded text in the test set of texts based at least on the second expanded text being within the threshold ranking.

19. The one or more media of claim 15, wherein the operations further comprise:

determining a nearest distance value between the second expanded text and the second base text corresponding to the second expanded text;

determining that the nearest distance value is within a nearest distance threshold;

including the second expanded text in the test set of texts based at least on the nearest distance value between the second expanded text and the second base text being within the nearest distance threshold.

* * * * *

UNITED STATES PATENT AND TRADEMARK OFFICE
CERTIFICATE OF CORRECTION

| | |
|---|---|
| PATENT NO. | : 11,934,795 B2 |
| APPLICATION NO. | : 17/392562 |
| DATED | : March 19, 2024 |
| INVENTOR(S) | : Nizar et al. |

It is certified that error appears in the above-identified patent and that said Letters Patent is hereby corrected as shown below:

In the Specification

In Column 11, Line 22, delete "Paris?<mask>" and insert -- Paris? <mask> --, therefor.

In Column 16, Line 6, delete "today";" and insert -- today". --, therefor.

In Column 23, Line 39, delete "2.3" and insert -- 2.3; --, therefor.

In Column 23, Line 41, delete "6.3" and insert -- 6.3. --, therefor.

In the Claims

In Column 29, Line 54, in Claim 9, delete "text" and insert -- text, --, therefor.

In Column 32, Line 5, in Claim 15, delete "text" and insert -- text, of the set of expanded texts, --, therefor.

Signed and Sealed this
Thirtieth Day of July, 2024

*Katherine Kelly Vidal*
Katherine Kelly Vidal
*Director of the United States Patent and Trademark Office*